US011177862B2

(12) United States Patent
Wei et al.

(10) Patent No.: US 11,177,862 B2
(45) Date of Patent: Nov. 16, 2021

(54) HYBRID CLASS B FD-MIMO

(71) Applicants:QUALCOMM Incorporated, San Diego, CA (US); Chao Wei, Beijing (CN); Yu Zhang, Beijing (CN); Bo Chen, Beijing (CN); Jilei Hou, San Diego, CA (US)

(72) Inventors: Chao Wei, Beijing (CN); Yu Zhang, Beijing (CN); Bo Chen, Beijing (CN); Jilei Hou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 263 days.

(21) Appl. No.: 16/088,285

(22) PCT Filed: May 10, 2017

(86) PCT No.: PCT/CN2017/083767
§ 371 (c)(1),
(2) Date: Sep. 25, 2018

(87) PCT Pub. No.: WO2017/193934
PCT Pub. Date: Nov. 16, 2017

(65) Prior Publication Data
US 2020/0304178 A1   Sep. 24, 2020

(30) Foreign Application Priority Data
May 12, 2016   (WO) ................ PCT/CN2016/081854

(51) Int. Cl.
*H04W 4/00* (2018.01)
*H04B 7/0452* (2017.01)
(Continued)

(52) U.S. Cl.
CPC ......... *H04B 7/0452* (2013.01); *H04B 7/0417* (2013.01); *H04B 7/0456* (2013.01);
(Continued)

(58) Field of Classification Search
CPC .. H04B 7/0417; H04B 7/0452; H04B 7/0456; H04B 7/0617; H04B 7/0626;
(Continued)

(56) References Cited

U.S. PATENT DOCUMENTS 9,497,002 B2   11/2016   Wei
2014/0044044 A1*   2/2014   Josiam ............. H04W 72/1226
370/328
(Continued)

FOREIGN PATENT DOCUMENTS

CN   102546110 A   7/2012
CN   104955061 A   9/2015
(Continued)

OTHER PUBLICATIONS

International Search Report and Written Opinion—PCT/CN2016/081854—ISA/EPO—dated Feb. 3, 2017.
(Continued)

*Primary Examiner* — Minh Trang T Nguyen
(74) *Attorney, Agent, or Firm* — Liem T. Do

(57) ABSTRACT

A hybrid class B channel state information (CSI) reference signal (CSI-RS) scheme is discussed which configures one cell-common beamformed CSI-RS resource for beam tracking and another UE-specific beamformed CSI-RS resource for CSI feedback. The cell-common beamformed CSI-RS resource may be transmitted at a longer periodicity and shared by user equipments (UEs) in the cell. The beamforming may be cycled over a set of predefined weights transparent to UE. The UE-specific beamformed CSI-RS may be transmitted at a shorter periodicity and can be activated dynamically to allow resource sharing among multiple UEs. The UEs will report a CSI for the cell-common beamformed CSI-RS resource which provides a quality indicator for the associated cell-common beam and is utilized by the base
(Continued)

station to determine the precoding weight for the UE-specific beamformed CSI-RS resource. Both resources can be configured with different parameter sets, such as number of ports, codebook type, and CSI reporting parameters.

24 Claims, 17 Drawing Sheets

(51) Int. Cl.
*H04B 7/0417* (2017.01)
*H04B 7/0456* (2017.01)
*H04B 7/06* (2006.01)
*H04L 5/00* (2006.01)

(52) U.S. Cl.
CPC ......... *H04B 7/0617* (2013.01); *H04B 7/0626* (2013.01); *H04L 5/005* (2013.01); *H04L 5/0023* (2013.01); *H04L 5/0051* (2013.01); *H04L 5/0057* (2013.01)

(58) Field of Classification Search
CPC ..... H04B 7/0639; H04L 5/0023; H04L 5/005; H04L 5/0051; H04L 5/0057
See application file for complete search history.

(56) References Cited

U.S. PATENT DOCUMENTS

| | | | | |
|---|---|---|---|---|
| 2015/0023280 A1* | 1/2015 | Kim | ...................... | H04L 5/0073 370/329 |
| 2015/0195071 A1* | 7/2015 | Lunttila | ................ | H04L 5/0053 370/329 |
| 2015/0215018 A1* | 7/2015 | Xiong | ................... | H04W 72/06 370/329 |
| 2015/0222340 A1* | 8/2015 | Nagata | ................ | H04L 25/0224 375/267 |
| 2015/0358060 A1* | 12/2015 | Park | .......................... | H04L 1/06 370/329 |
| 2020/0204221 A1* | 6/2020 | Tong | .................... | H04B 7/0417 |

FOREIGN PATENT DOCUMENTS

| | | |
|---|---|---|
| CN | 105007126 A | 10/2015 |
| EP | 2869478 A1 | 5/2015 |
| JP | 2013528007 A | 7/2013 |
| WO | 2014117748 A1 | 8/2014 |
| WO | 2015095020 A1 | 6/2015 |
| WO | 2015195020 A1 | 12/2015 |
| WO | 2016011651 A1 | 1/2016 |
| WO | 2016056980 A1 | 4/2016 |

OTHER PUBLICATIONS

International Search Report and Written Opinion—PCT/CN2017/083767—ISA/EPO—dated Jul. 26, 2017.
Supplementary European Search Report—EP17795552—Search Authority—Munich—dated Jan. 30, 2020.
Supplementary Partial European Search Report—EP17795552—Search Authority—Munich—dated Oct. 14, 2019.

* cited by examiner

HYBRID CLASS B FD-MIMO

CROSS-REFERENCE TO RELATED APPLICATIONS

This application claims the benefit of Application No. PCT/CN2016/081854, entitled. "HYBRID CLASS B FD-MIMO," filed on May 12, 2016, which is expressly incorporated by reference herein in its entirety.

BACKGROUND

Field

Aspects of the present disclosure relate generally to wireless communication systems, and more particularly, to a hybrid beamformed CSI-RS scheme for full dimension multiple input, multiple output (FD-MIMO) systems with a large number of antennas.

BACKGROUND

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks. Time Division Multiple Access (TDMA) networks. Frequency Division Multiple Access (FDMA) networks. Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

In one aspect of the disclosure, a method of wireless communication includes transmitting a cell-common beamformed channel state information (CSI) reference signal (CSI-RS) resource, wherein the cell-common beamformed CSI-RS resource is weighted by cycling through a set of predefined preceding weights, receiving CSI feedback from at least one UE, wherein the CSI feedback is based on the cell-common beamformed CSI-RS resource, and transmitting to the at least one UE a UE-specific beamformed CSI-RS resource, wherein the UE-specific beamformed CSI-RS resource is configured based on the CSI feedback from the at least one UE.

In one aspect of the disclosure, a method of wireless communication includes detecting a cell-common beamformed CSI-RS resource from a serving base station, transmitting a first CSI report based on measurements of the cell-common beamformed CSI-RS resource, receiving a UE-specific beamformed CSI-RS resource from the serving base station, wherein the UE-specific beamformed CSI-RS resource is dynamically configured based on the first CSI report, and transmitting a second CSI report based on measurements of the UE-specific beamformed CSI-RS resource.

In one aspect of the disclosure, an apparatus configured for wireless communication includes means for transmitting a cell-common beamformed channel state information (CSI) reference signal (CSI-RS) resource, wherein the cell-common beamformed CSI-RS resource is weighted by cycling through a set of predefined precoding weights, means for receiving CSI feedback from at least one user equipment (UE), wherein the CSI feedback is based on the cell-common beamformed CSI-RS resource, and means for transmitting to the at least one UE a UE-specific beamformed CSI-RS resource, wherein the UE-specific beamformed CSI-RS resource is configured based on the CSI feedback from the at least one UE.

In one aspect of the disclosure, an apparatus configured for wireless communication includes means for detecting a cell-common beamformed channel state information (CSI) reference signal (CSI-RS) resource from a serving base station, means for transmitting a first CSI report based on measurements of the cell-common beamformed CSI-RS resource, means for receiving a user equipment (UE)-specific beamformed CSI-RS resource from the serving base station, wherein the UE-specific beamformed CSI-RS resource is configured based on the first CSI report, and means for transmitting a second CSI report based on measurements of the UE-specific beamformed CSI-RS resource.

In an additional aspect of the disclosure, a non-transitory computer-readable medium having program code recorded thereon. The program code further includes program code for causing a computer to transmit a cell-common beamformed channel state information (CSI) reference signal (CSI-RS) resource, wherein the cell-common beamformed CSI-RS resource is weighted by cycling through a set of predefined precoding weights, program code for causing the computer to receive CSI feedback from at least one user equipment (UE), wherein the CSI feedback is based on the cell-common beamformed CSI-RS resource, and program code for causing the computer to transmit to the at least one UE a UE-specific beamformed CSI-RS resource, wherein the UE-specific beamformed CSI-RS resource is configured based on the CSI feedback from the at least one UE.

In an addition aspect of the disclosure, a non-transitory computer-readable medium having program code recorded thereon. The program code further includes program code for causing a computer to detect a cell-common beamformed channel state information (CSI) reference signal (CSI-RS) resource from a serving base station, program code for causing the computer to transmit a first CSI report based on measurements of the cell-common beamformed CSI-RS resource, program code for causing the computer to receive a user equipment (UE)-specific beamformed CSI-RS resource from the serving base station, wherein the UE-specific beamformed CSI-RS resource is configured based on the first CSI report, and program code for causing the computer to transmit a second CSI report based on measurements of the UE-specific beamformed CSI-RS resource.

In another aspect of the disclosure, an apparatus configured for wireless communication is disclosed. The apparatus includes at least one processor, and a memory coupled to the processor. The processor is configured to transmit a cell-common beamformed channel state information (CSI) reference signal (CSI-RS) resource, wherein the cell-common beamformed CSI-RS resource is weighted by cycling through a set of predefined precoding weights, to receive CSI feedback from at least one user equipment (UE), wherein the CSI feedback is based on the cell-common beamformed CSI-RS resource, and to transmit to the at least one UE a UE-specific beamformed CSI-RS resource, wherein the UE-specific beamformed CSI-RS resource is configured based on the CSI feedback from the at least one UE.

In another aspect of the disclosure, an apparatus configured for wireless communication is disclosed. The apparatus includes at least one processor, and a memory coupled to the processor. The processor is configured to detect a cell-common beamformed channel state information (CSI) reference signal (CSI-RS) resource from a serving base station, to transmit a first CSI report based on measurements of the cell-common beamformed CSI-RS resource, to receive a user equipment (UE)-specific beamformed CSI-RS resource from the serving base station, wherein the UE-specific beamformed CSI-RS resource is configured based on the first CSI report, and to transmit a second CSI report based on measurements of the UE-specific beamformed CSI-RS resource.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
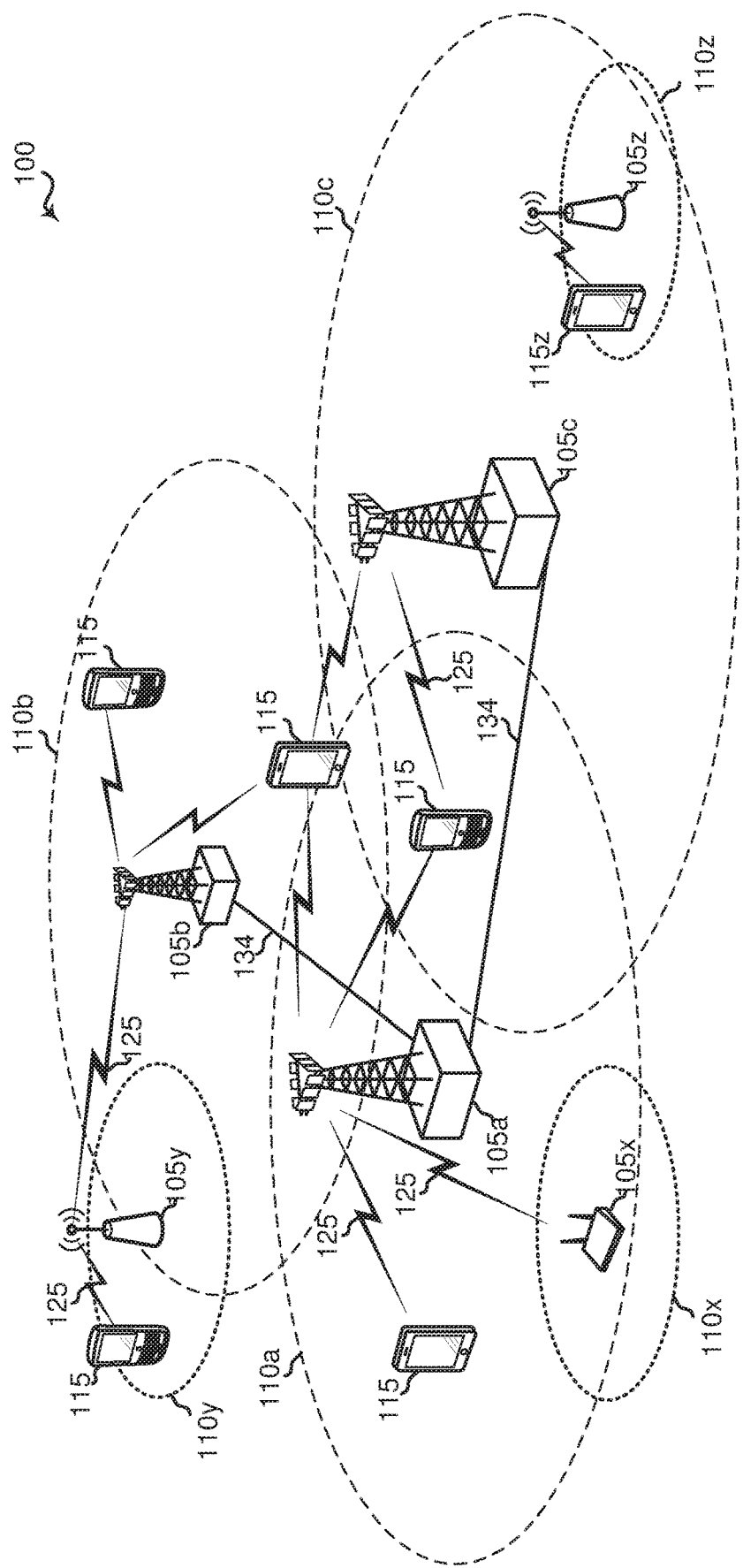
FIG. 1 is a block diagram illustrating details of a wireless communication system.

The detailed description set forth below, in connection with the appended drawings, is intended as a description of various possible configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, as well as other communications networks. As described herein, the terms "networks" and "systems" may be used interchangeably.

A CDMA network may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may implement a radio technology such as Global System for Mobile Communications (GSM). 3GPP defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. An operator network may also include one or more LTE networks, and/or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project aimed at improving the universal mobile telecommunications system (UMTS) mobile phone standard. The 3GPP may define specifications for the next generation of mobile networks, mobile systems, and mobile devices. For clarity, certain aspects of the apparatus and techniques may be described below for LTE implementations or in an LTE-centric way, and LTE terminology may be used as illustrative examples in portions of the description below; however, the description is not intended to be limited to LTE applications. Indeed, the present disclosure is concerned with shared access to wireless spectrum between networks using different radio access technologies or radio air interfaces.

A new carrier type based on LTE/LTE-A including in unlicensed spectrum has also been suggested that can be compatible with carrier-grade WiFi, making LTE/LTE-A with unlicensed spectrum an alternative to WiFi. LTE/LTE-A, when operating in unlicensed spectrum, may leverage LTE concepts and may introduce some modifications to physical layer (PHY) and media access control (MAC) aspects of the network or network devices to provide efficient operation in the unlicensed spectrum and meet regulatory requirements. The unlicensed spectrum used may range from as low as several hundred Megahertz (MHz) to as high as tens of Gigahertz (GHz), for example. In operation, such LTE/LTE-A networks may operate with any combination of licensed or unlicensed spectrum depending on loading and availability. Accordingly, it may be apparent to one of skill in the art that the systems, apparatus and methods described herein may be applied to other communications systems and applications.

System designs may support various time-frequency reference signals for the downlink and uplink to facilitate beamforming and other functions. A reference signal is a signal generated based on known data and may also be referred to as a pilot, preamble, training signal, sounding signal, and the like. A reference signal may be used by a receiver for various purposes such as channel estimation, coherent demodulation, channel quality measurement, signal strength measurement, and the like. MIMO systems using multiple antennas generally provide for coordination of sending of reference signals between antennas; however, LTE systems do not in general provide for coordination of sending of reference signals from multiple base stations or eNBs.

In some implementations, a system may utilize time division duplexing (TDD). For TDD, the downlink and uplink share the same frequency spectrum or channel, and downlink and uplink transmissions are sent on the same frequency spectrum. The downlink channel response may thus be correlated with the uplink channel response. Reciprocity may allow a downlink channel to be estimated based on transmissions sent via the uplink. These uplink transmissions may be reference signals or uplink control channels (which may be used as reference symbols after demodulation). The uplink transmissions may allow for estimation of a space-selective channel via multiple antennas.

In LTE implementations, orthogonal frequency division multiplexing (OFDM) is used for the downlink—that is, from a base station, access point or eNodeB (eNB) to a user terminal or UE. Use of OFDM meets the LTE requirement for spectrum flexibility and enables cost-efficient solutions for very wide carriers with high peak rates, and is a well-established technology. For example, OFDM is used in standards such as IEEE 802.11a/g, 802.16, High Performance Radio LAN-2 (HIPERLAN-2, wherein LAN stands for Local Area Network) standardized by the European Telecommunications Standards Institute (ETSI), Digital Video Broadcasting (DVB) published by the Joint Technical Committee of ETSI, and other standards.

Time frequency physical resource blocks (also denoted here in as resource blocks or "RBs" for brevity) may be defined in OFDM systems as groups of transport carriers (e.g. sub-carriers) or intervals that are assigned to transport data. The RBs are defined over a time and frequency period. Resource blocks are comprised of time-frequency resource elements (also denoted here in as resource elements or "REs" for brevity), which may be defined by indices of time and frequency in a slot. Additional details of LTE RBs and REs are described in the 3GPP specifications, such as, for example, 3GPP TS 36.211.

UMTS LTE supports scalable carrier bandwidths from 20 MHz down to 1.4 MHZ. In LTE, an RB is defined as 12 sub-carriers when the subcarrier bandwidth is 15 kHz, or 24 sub-carriers when the sub-carrier bandwidth is 7.5 kHz. In an exemplary implementation, in the time domain there is a defined radio frame that is 10 ms long and consists of 10 subframes of 1 millisecond (ms) each. Every subframe consists of 2 slots, where each slot is 0.5 ms. The subcarrier spacing in the frequency domain in this case is 15 kHz. Twelve of these subcarriers together (per slot) constitute an RB, so in this implementation one resource block is 180 kHz. Six Resource blocks fit in a carrier of 1.4 MHz and 100 resource blocks fit in a carrier of 20 MHz.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 shows a wireless network 100 for communication, which may be an LTE-A network. The wireless network 100 includes a number of evolved node Bs (eNBs) 105 and other network entities. An eNB may be a station that communicates with the UEs and may also be referred to as a base station, a node B, an access point, and the like. Each eNB 105 may provide communication coverage for a particular geographic area. In 3GPP, the term "cell" can refer to this particular geographic coverage area of an eNB and/or an eNB subsystem serving the coverage area, depending on the context in which the term is used.

An eNB may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. In the example shown in FIG. 1, the eNBs 105a, 105b and 105c are macro eNBs for the macro cells 110a, 110b and 110c, respectively. The eNBs 105x, 105y, and 105z are small cell eNBs, which may include pico or femto eNBs that provide service to small cells 110x, 110y, and 110z, respectively. An eNB may support one or multiple (e.g., two, three, four, and the like) cells.

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with macro eNBs, pico eNBs, femto eNBs, relays, and the like. In FIG. 1, a lightning bolt (e.g., communication links 125) indicates wireless transmissions between a UE and a serving eNB, which is an eNB designated to serve the UE on the downlink and/or uplink, or desired transmission between eNBs. Wired backhaul communication 134 indicate wired backhaul communications that may occur between eNBs.

LTE/-A utilizes orthogonal frequency division multiplexing (OFDM) on the downlink and single-carrier frequency division multiplexing (SC-FDM) on the uplink. OFDM and SC-FDM partition the system bandwidth into multiple (X) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (X) may be dependent on the system bandwidth. For example, X may be equal to 72, 180, 300, 600, 900, and 1200 for a corresponding system bandwidth of 1.4, 3, 5, 10, 15, or 20 megahertz (MHz), respectively. The system bandwidth may also be partitioned into sub-bands. For example, a sub-band may cover 1.08 MHz, and there may be 1, 2, 4, 8 or 16 sub-bands for a corresponding system bandwidth of 1.4, 3, 5, 10, 15, or 20 MHz, respectively.

Figure 2:
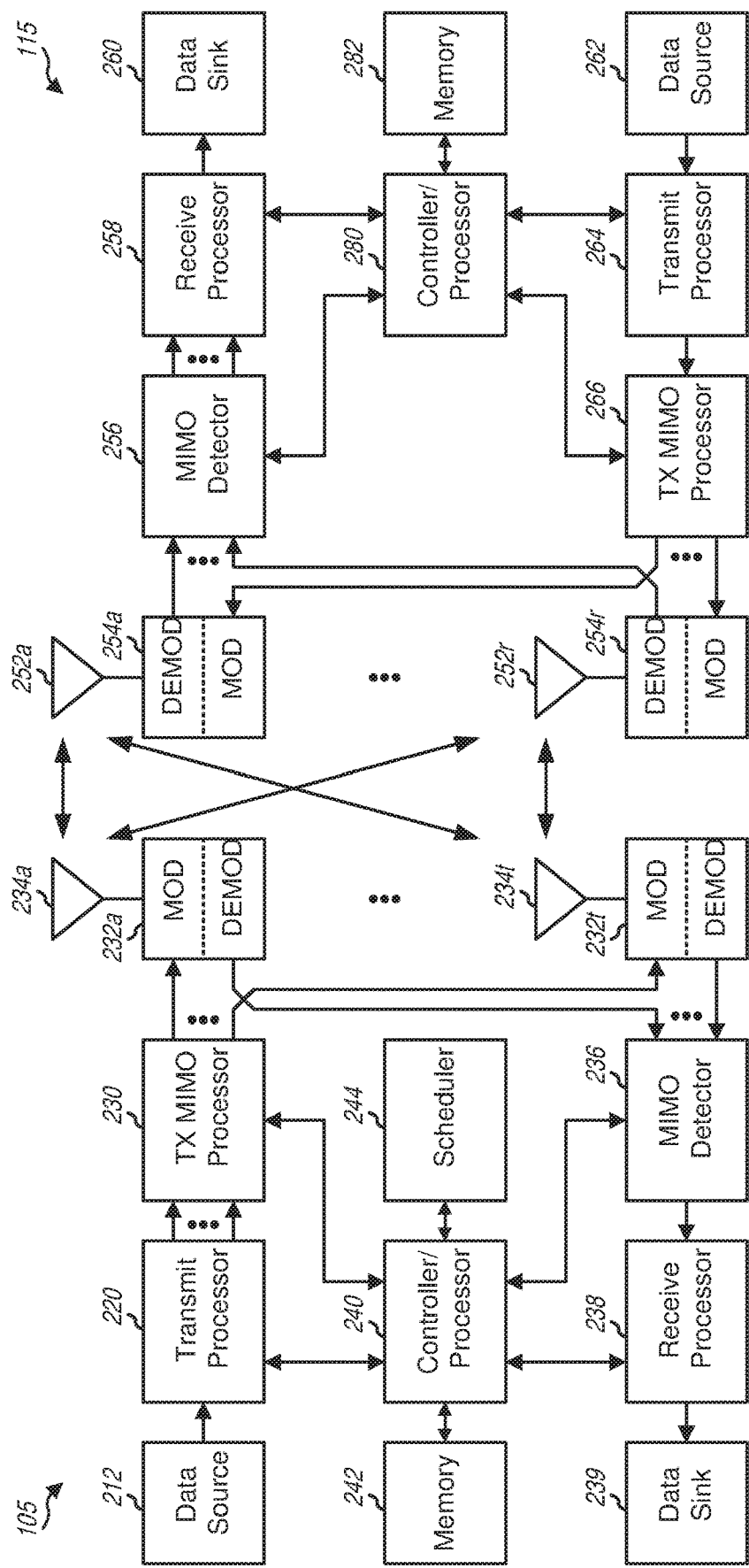
FIG. 2 is a block diagram conceptually illustrating a design of a base station/eNB and a UE configured according to one aspect of the present disclosure.

FIG. 2 shows a block diagram of a design of a base station/eNB 105 and a UE 115, which may be one of the base stations/eNBs and one of the UEs in FIG. 1. For a restricted association scenario, the eNB 105 may be the small cell eNB 105z in FIG. 1, and the UE 115 may be the UE 115z, which in order to access small cell eNB 105z, would be included in a list of accessible UEs for small cell eNB 105z. The eNB 105 may also be a base station of some other type. The eNB 105 may be equipped with antennas 234a through 234t, and the UE 115 may be equipped with antennas 252a through 252r.

At the eNB 105, a transmit processor 220 may receive data from a data source 212 and control information from a controller/processor 240. The control information may be for the PBCH, PCFICH, PHICH, PDCCH, etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the eNB 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the eNB 105. At the eNB 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the eNB 105 and the UE 115, respectively. The controller/processor 240 and/or other processors and modules at the eNB 105 may perform or direct the execution of various processes for the techniques described herein. The controllers/processor 280 and/or other processors and modules at the UE 115 may also perform or direct the execution of the functional blocks illustrated in FIGS. 7, 9A, 9B, and 11, and/or other processes for the techniques described herein. The memories 242 and 282 may store data and program codes for the eNB 105 and the UE 115, respectively. A scheduler 244 may schedule UEs for data transmission on the downlink and/or uplink.

Multiple-input multiple-output (MIMO) technology generally allows communication to take advantage of the spatial dimension through use of channel state information (CSI) feedback at the eNB. An eNB may broadcast cell-specific CSI reference signals (CSI-RS) for which the UE measures CSI based on configurations signaled by eNB via RRC, such as CSI-RS resource configuration and transmission mode. The CSI-RS are periodically transmitted at periodicities of 5, 10, 20, 40, 80 ms, or the like. A UE may report CSI at CSI reporting instances also configured by the eNB. As a part of CSI reporting the UE generates and reports channel quality indicator (CQI), precoding matrix indicator (PMI), and rank indicator (RI). The CSI can be reported either via PUCCH or via PUSCH and may be reported either periodically or aperiodically, with potentially different granularity. When reported via PUCCH, the payload size for CSI may be limited.

In order to increase system capacity, full-dimensional (FD)-MIMO technology has been considered, in which an eNB uses a two-dimensional (2D) active antenna array with a large number of antennas with antenna ports having both horizontal and vertical axes, and has a larger number of transceiver units. For conventional MIMO systems, beamforming has typically implemented using only azimuth dimension, although of a 3D multi-path propagation. However, for FD-MIMO each transceiver unit has its own independent amplitude and phase control. Such capability together with the 2D active antenna array allows the transmitted signal to be steered not only in the horizontal direction, as in conventional multi-antenna systems, but also simultaneously in both the horizontal and the vertical direction, which provides more flexibility in shaping beam directions from an eNB to a UE. Providing dynamic beam steering in the vertical direction has been shown to result in significant gain in interference avoidance. Thus, FD-MIMO technologies may take advantage of both azimuth and elevation beamforming, which would greatly improve MIMO system capacity and signal quality.

Figure 3:
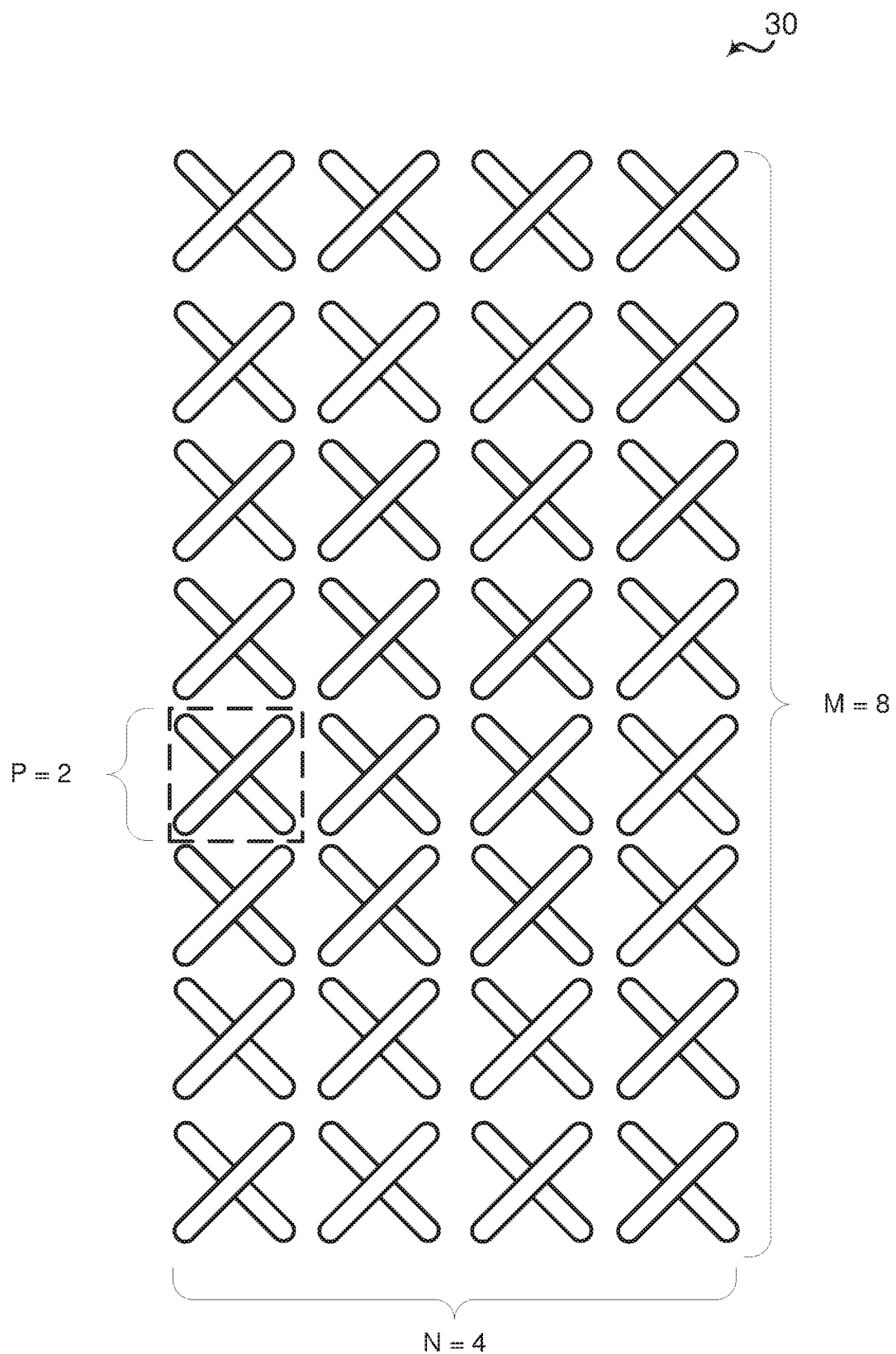
FIG. 3 is a block diagram illustrating a typical 2D active antenna array.

FIG. 3 is a block diagram illustrating a typical 2D active antenna array 30. Active antenna array 30 is a 64-transmitter, cross-polarized uniform planar antenna array comprising four columns, in which each column includes eight cross-polarized vertical antenna elements. Active antenna arrays are often described according to the number of antenna columns (N), the polarization type (P), and the number of vertical elements having the same polarization type in one column (M). Thus, active antenna array 30 has four columns (N=4), with eight vertical (M=8) cross-polarized antenna elements (P=2).

For a 2D array structure, in order to exploit the vertical dimension by elevation beamforming the CSI is needed at the base station. The CSI, in terms of PMI, RI, and CQI, can be fed back to the base station by a mobile station based on downlink channel estimation and predefined PMI codebook(s). However, different from the conventional MIMO system, the eNB capable of FD-MIMO is typically equipped with a large scale antenna system and, thus, the acquisition of full array CSI from the UE is quite challenging due to the complexity of channel estimation and both excessive downlink CSI-RS overhead and uplink CSI feedback overhead.

Figure 4A:
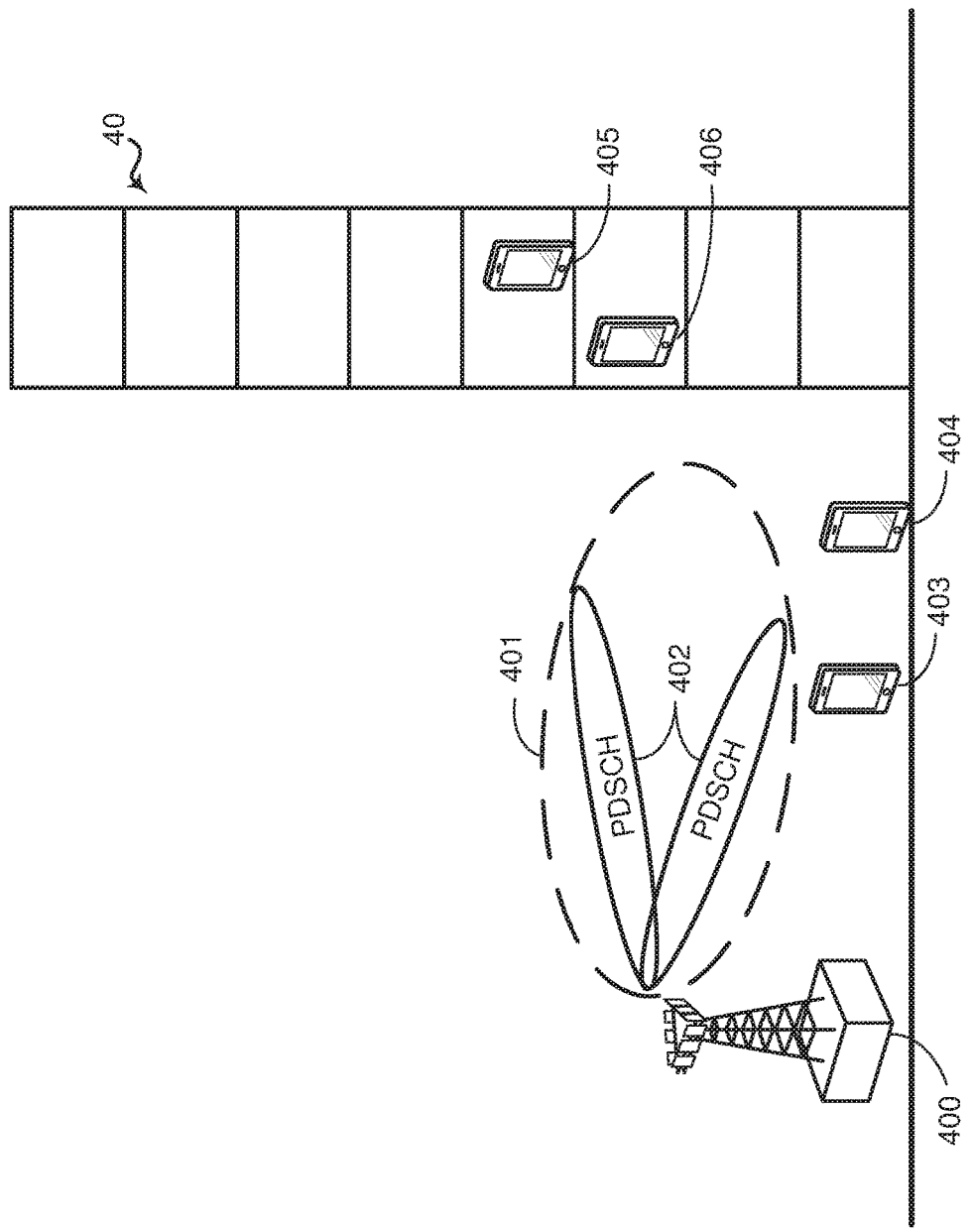
FIG. 4A is a block diagram illustrating an example base station transmitting non-precoded CSI-RS.

For CSI reporting in systems having FD-MIMO, a CSI process may be configured with either of two CSI reporting classes, class A non-preceded or class B beamformed. FIG. 4A is a block diagram illustrating an example base station 400 transmitting non-preceded CSI-RS 401. In class A non-precoded reporting, one non-zero power (NZP) CSI-RS resource per CSI process may be used for channel measurement in which the number of CSI-RS ports may be 8, 12, or 16. This category includes schemes where different CSI-RS ports may have the same wide beam width and direction and, hence, generally are useful in cell wide coverage. Interference measurement in class A reporting may include one CSI-interference measurement (IM) resource per CSI process. The UE may report rank indicator, and CQI, as well as PMI, which consists of a first PMI corresponding to the parameters ($i_{11}$, $i_{12}$) and one or multiple second PMI corresponding to the parameter, $i_2$.

Base station 400 serves UEs 403 and 404 and UEs 405 and 406 in structure 40. 2D CSI-RS ports transmit non-precoded CSI-RS 401 and PDSCH 402 to UEs 403-406. In reporting CSI feedback, UEs 403-406 measure the non-precoded CSI-RS and reports CQI, first PMI ($i_{11}$, $i_{12}$) and second PMI, $i_2$, (2D codebook), and rank indicator to base station 400.

Figure 4B:
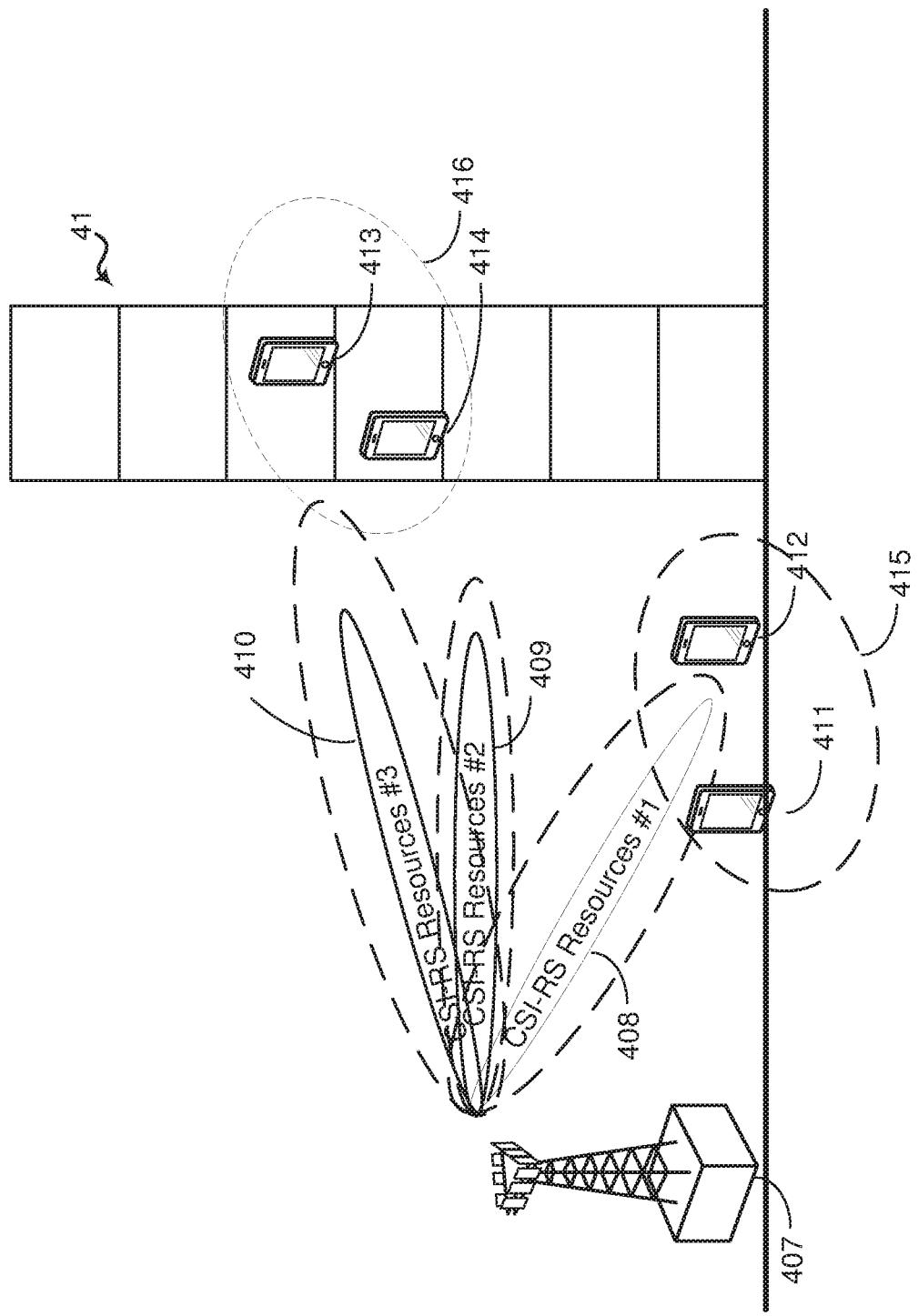
FIG. 4B is a block diagram illustrating an example base station transmitting beamformed CSI-RS using CSI-RS resources.

FIG. 4B is a block diagram illustrating an example base station 407 transmitting beamformed CSI-RS using CSI-RS resources 408-410. CSI-RS resources 408-410 may be directed to serve different UE groups, such as UE group 415, including UEs 411 and 412, and UE group 416, including UEs 413 and 414 in structure 41. Because different CSI-RS resources are used for different UE groups, when providing CSI feedback, UEs 411-414 report CQI, PMI (1D codebook), rank indicator, as well as the CSI-RS resource indicator (CRI), if K>1, which identifies to base station 407 which of the CSI-RS resources the UE has measured and provided CSI feedback for.

In class B beamformed CSI reporting, each CSI process may be associated with K NZP CSI-RS resources/configurations, with $N_k$ ports for the $k^{th}$ CSI-RS resource (K could be ≥1), in which $N_k$ may be 1, 2, 4, or 8, and may be different for each CSI-RS resource. Each CSI-RS resource may also have different CSI-RS port virtualization, e.g., virtualized from different sets of antenna elements or from the same set of antenna elements but with different beamforming weights. This category includes schemes where, at least at a given time/frequency, CSI-RS ports have narrow beam widths and, hence, would be generally less suitable for cell wide coverage. Some of the CSI-RS port resource combinations may have different beam directions. Multiple CSI-IM per CSI process is also possible, with one-to-one linkage to each NZP CSI-RS resource.

For a class B enhanced MIMO (eMIMO)-type beamformed CSI-RS with K>1 CSI-RS resources, a UE would report a wideband CRI (CSI-RS resource indicator) and the CQI/PMI/RI for the selected CSI-RS resource identified by the reported CRI. If the number of antenna ports of the selected CSI-RS resource is 4 or 8, then the PMI feedback may include a first PMI $i_1$ and one or multiple second PMI $i_2$. The maximum number of CSI-RS resources associated with a CSI process, $K_{max}$, depends on the UE capability. Current UE capabilities support $K_{max}$ of 1 ... 8.

For class B eMIMO-type beamformed CSI-RS with K=1 CSI-RS resource, CQI/PMI/RI is reported based on whether the alternative codebook defined for class B CSI-RS is activated. If the alternative codebook is activated, the first PMI $i_1$ may be fixed to zero and only the second PMI, $i_2$, is reported. The associated $W_2$ codebook may be used for port pair selection and polarization co-phasing. Otherwise, the reported PMI may include a first PMI and one or multiple second PMI for 4 or 8 antenna ports.

A hybrid CSI-RS operation has been defined that targets joint utilization of different CSI-RS types, such as between NP CSI-RS and BF CSI-RS, as well as between different types of beamformed CSI-RS. CSI reporting for hybrid CSI-RS is performed in two stages. In a first stage of CSI reporting, a long-term CSI, measured on either NP CSI-RS or cell-common beamformed CSI-RS, is reported to an eNB. In the second stage of CSI reporting, the UE measures beamformed CSI-RS precoded based on the first stage CSI report and reports short term CSI feedback, including RI/PMI/CQI. Hybrid CSI-RS based FD-MIMO has the benefit of reducing CSI-RS overhead and UE complexity in order to improve FD-MIMO performance.

Table 1 below identifies possible combinations for hybrid CSI-RS that have been proposed for implementation.

TABLE 1

| First eMIMO-Type | | Second eMIMO-Type | |
|---|---|---|---|
| eMIMO-Type | CSI Reporting Content | eMIMO-Type | CSI Reporting Content |
| Class A | ($i_1$, RI) or ($i_1$) | Class B $K_2 = 1$ | (RI, CQI, PMI) |
| Class B $K_1 > 1$ | CRI, and optionally $i_1$ | Class B $K_2 = 1$ | (RI, CQI, PMI) |
| Class B $K_1 > 1$ | $K_1$ independent CSI reports | Class B $K_2 = 1$ | (RI, CQI, PMI) |
| Class B $K_1 = 1$ | PMI | Class B $K_2 > 1$ | (RI, CQI, PMI) |

The hybrid class B K>1 and class B K=1 schemes are used to enhance the existing class B K>1 CSI-RS operations by relaxing the CRI reporting to a long term periodicity rather than every 5 ms, as currently provided. The total CSI-RS overhead may be reduced compared to Rel-13 class B K>1 because the transmission of the second stage CSI-RS can be adapted based on the CRI feedback from the UE, e.g., not all to be transmitted. However, UE complexity may not be reduced as the UE would still be configured to measure multiple CSI-RS resources for first stage CSI feedback, though the measurement would be less frequently.

Figure 5:
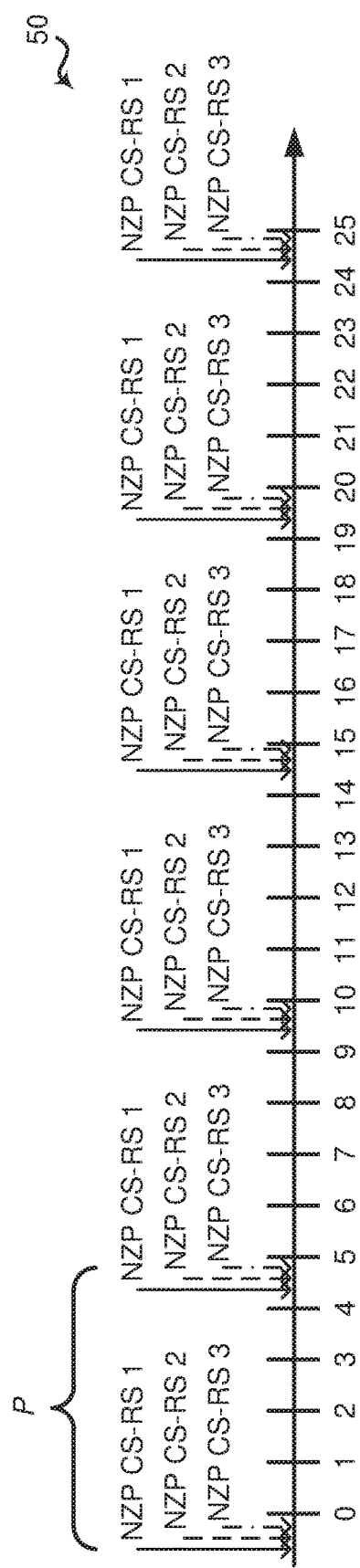
FIG. 5 is a block diagram illustrating a transmission stream with Rel-13 class B K>1 CSI-RS operations.

FIG. 5 is a block diagram illustrating transmission stream 50 with Rel-13 class B K>1 CSI-RS operations. For example, with K=3, three sets of CSI-RS resources (NZP CSI-RS 1, NZP CSI-RS 2, NZP CSI-RS 3) are transmitted at a periodicity, P, e.g., every 5 ms. A UE would measure all three CSI-RS resources and report the CRI and CSI for the selected resources every 5 ms.

Figure 6:
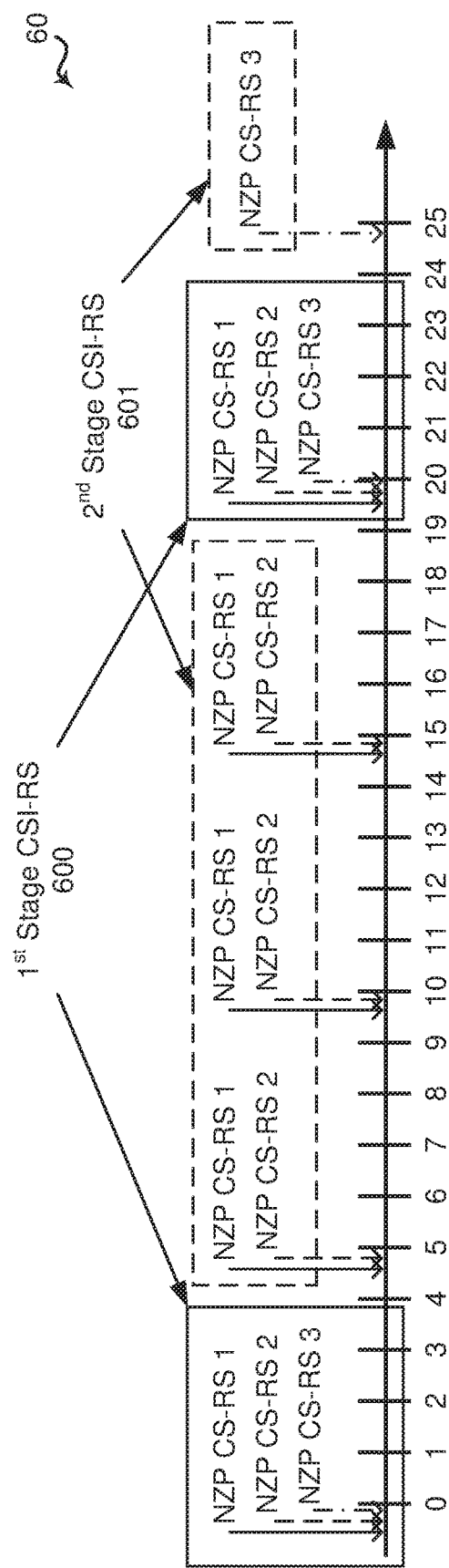
FIG. 6 is a block diagram illustrating a transmission stream with hybrid class B K>1 and K=1 CSI-RS operations.

FIG. 6 is a block diagram illustrating transmission stream 60 with hybrid class B K>1 and K=1 CSI-RS operations. First stage CSI-RS 600 includes three resources (NZP CSI-RS 1, NZP CSI-RS 2, NZP CSI-RS 3) transmitted every 20 ms and second stage CSI-RS 601 can be dynamically assigned according to CRI feedback. Thus. CSI reporting overhead is reduced by performing CRI reporting every 20 ms instead of every 5 ms.

For hybrid class B CSI-RS operations, the CSI processing envelope varies greatly due to the measurement of K>1 CSI-RS resources for CRI reporting at the first stage CSI feedback. For UEs supporting a small number of CSI-RS resources for CRI reporting, the eNB would dynamically configure a subset of CSI-RS resources from the resource pool based on the change of the UE's position. However, UEs do not currently support information to assist reconfiguration. If the muted CSI-RS resources of the second stage are reused for data transmission, the dynamic indication of PDSCH rate matching pattern would operate to support all the combinations. However, the current specifications define support for up to four PDSCH rate matching states. For example, for K=4 CSI-RS resources, the possible combinations for second stage CSI-RS transmission could be $C_4^0+C_4^1+C_4^2+C_4^3+C_4^4=16$, which implies a total of 16 different rate matching patterns dynamically indicated by the relevant DCI, e.g., by a 4-bit field rather than 2-bit field. However, for legacy UEs supporting only up to four rate matching states, puncturing will result when colliding with the second stage CSI-RS transmissions which will result in a diminished performance.

Figure 7:
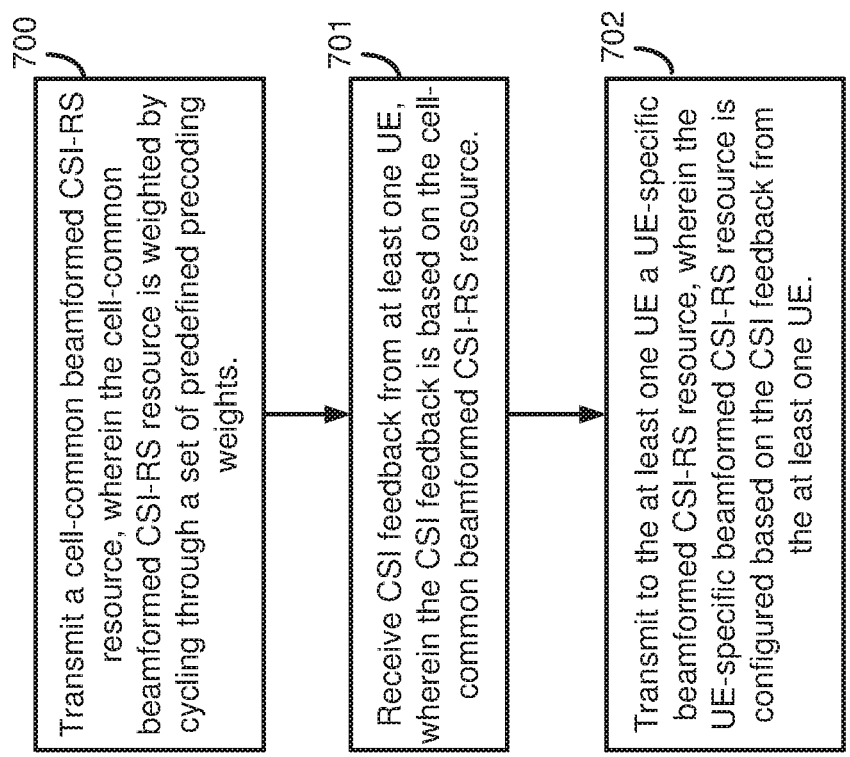
FIG. 7 is a block diagram illustrating example blocks executed to implement one aspect of the present disclosure.
Figure 14:
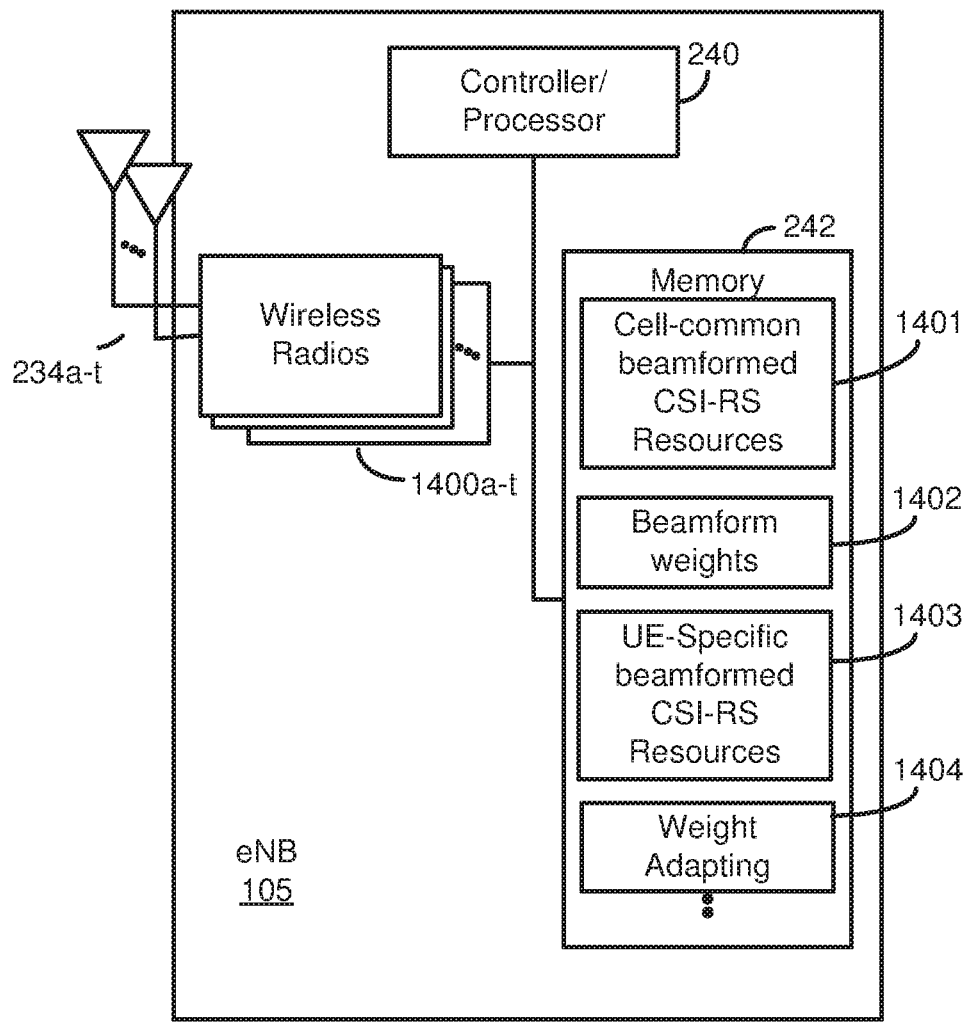
FIG. 14 is a block diagram illustrating a eNB configured according to one aspect of the present disclosure.

FIG. 7 is a block diagram illustrating example blocks executed to implement one aspect of the present disclosure. The example blocks will also be described with respect to eNB 105 as illustrated in FIG. 14. FIG. 14 is a block diagram illustrating eNB 105 configured according to one aspect of the present disclosure. eNB 105 includes the structure, hardware, and components as illustrated for eNB 105 of FIG. 2. For example, eNB 105 includes controller/processor 240, which operates to execute logic or computer instructions stored in memory 242, as well as controlling the components of eNB 105 that provide the features and functionality of eNB 105. eNB 105, under control of controller/processor 240, transmits and receives signals via wireless radios 1400*a-t* and antennas 234*a-t*. Wireless radios 1400*a-t* includes various components and hardware, as illustrated in FIG. 2 for eNB 105, including modulator/demodulators 232*a-t*, MIMO detector 236, receive processor 238, transmit processor 220, and TX MIMO processor 230.

At block 700, an eNB transmits a cell-common beamformed CSI-RS resource, wherein the cell-common beamformed CSI-RS resource is weighted by cycling through a set of predefined precoding weights. The cell-common beamformed CSI-RS resource may be beamformed using one of a set of predefined preceding weights per each transmission instance common to all UEs within the cell, transmitted at a longer periodicity, and shared by all the UEs in the cell. For example, eNB 105, under control of controller/processor 240 executes cell-common beamformed CSI-RS 1401 in memory 242 to form the cell-common beamformed CSI-RS resource using also beamforming weights 1402 stored in memory 242. The beamforming of the cell-common beamformed CSI-RS resource may be cycled over a set of predefined weights at beamforming weights 1402 and transparent to UE.

At block 701, the eNB receives CSI feedback from at least one UE, wherein the CSI feedback is based on the cell-common beamformed CSI-RS resource. For example, eNB 105, under control of controller/processor 240, receives the CSI feedback over antennas 234*a-t* and wireless radios 1400*a-t* for processing. For UE reporting in response to the cell-common beamformed CSI-RS resource, a UE may report full or partial CSI. For example a full CSI may include RI/PMI/CQI, while a partial CSI includes at least RI (for $N_k>1$) and wideband CQI of the first codeword, and, optionally, a first PMI. The RI, if any, and wideband CQI may provide a quality indication for the associated cell-common beamformed CSI-RS resource and may also assist eNB 105 to determine the beamforming weights for the UE-specific beamformed CSI-RS resource. As another example, a partial CSI may include a wideband CQI of the first codeword, a differential CQI of the second codeword, and optional a first PMI. In a further example, the RI and the second PMI are not reported for the partial CSI. If the UE selects rank 1, the CQI for the second codeword can be set to the index 0 corresponding to a value of out-of-range.

It should be noted that a new CSI may be defined, such as CSI-RS reference signal receive power (RSRP), and used to assist the eNB for beam selection.

At block 702, the eNB transmits to the at least one UE a UE-specific beamformed CSI-RS resource, wherein the UE-specific beamformed CSI-RS resource is configured based on the CSI feedback from the at least one UE. eNB 105, under control of controller/processor 240, executes UE-specific beamformed CSI-RS 1403 stored in memory 242, to generate the UE-specific beamformed CSI-RS resource according to the feedback received from the UE based on the cell-common beamformed CSI-RS resource. The UE-specific beamformed CSI-RS resource is transmitted at a short periodicity, and can be turned off and on dynamically to allow resource sharing among multiple UEs. Both resources can be configured with different parameter sets, such as number of ports, codebook type, resource element (RE) location, and CSI reporting parameters including reporting modes, periodicity, and subframe offset. In response to the UE-specific beamformed CSI-RS resource, the UE would report a full CSI (RI/PMI/CQI), in which the PMI would include only the second PMI if the alternative class B codebook is configured.

Figure 8:
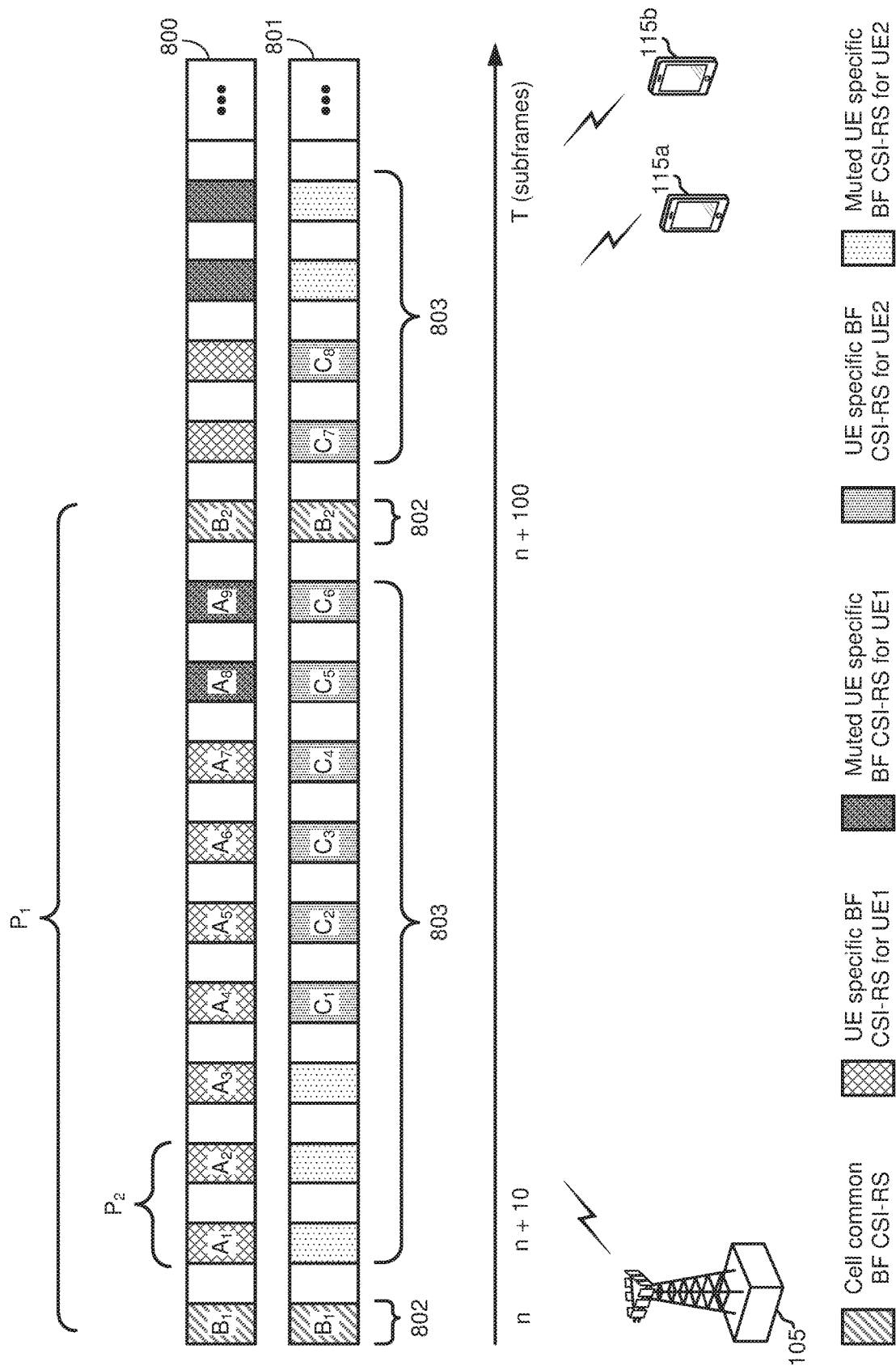
FIG. 8 is a block diagram illustrating an eNB and UEs configured according to one aspect of the present disclosure.

FIG. 8 is a block diagram illustrating an eNB 105 and UEs 115*a* and 115*b* configured according to one aspect of the present disclosure. Transmission streams 800 and 801 illustrate an example set of transmissions between eNB 105 and UEs 115*a* and 115*b* of cell-common and UE-specific beamformed CSI-RS resources. NZP CSI-RS #1 802 are cell-common beamformed CSI-RS resources, transmitted periodically at $P_1$ over transmission streams 800 and 801 between eNB 105 and UEs 115*a* and 115*b*. The precoding weight for NZP CSI-RS #1 802 may be changed at every transmission instance, by cycling through a set of semi-static precoding weights $(B_1, B_2, \ldots B_K)$. NZP CSI-RS #2 803 are UE-specific beamformed CSI-RS resources transmitted periodically at $P_2$ over transmission streams 800 and 801 between eNB 105 and UEs 115*a* and 115*b*. The precoding weights $(A_1, A_2, \ldots, A_K)$ and $(C_1, C_2, \ldots, C_K)$ for NZP CSI-RS #2 803 are adapted according to feedback, and may or may not be same as the cell-common precoding weight $B_k$ or also the previous weights $A_{k-1}$ for NZP CSI-RS #2 803 over transmission stream 800 or $C_{k-1}$ for NZP CSI-RS #2 803 over transmission stream 801.

Transmissions of UE-specific beamformed CSI-RS resources by eNB 105 over transmission streams 800 and 801 may be muted in order to reduce interference on the transmissions in the other transmission stream. For example, NZP CSI-RS #2 803 illustrated with precoding weights $A_1$, $A_2$, and $A_3$ over transmission stream 800 between eNB 105 and UE 115*a* occur while NZP CSI-RS #2 803 transmissions over transmission stream 801 are muted.

The CQI reported by UE 115*a* and 115*b* associated with the cell-common beamformed CSI-RS resources, NZP CSI-RS #1 802, can be used by eNB 105 to determine the precoding weights for the UE-specific beamformed CSI-RS resources, NZP CSI-RS #2 803. The UE-specific beamforming weight may be selected according to various alternative aspects, as implemented through execution by eNB 105, under control of controller/processor 240, of weight adapting 1404. The execution environment of weight adapting 1404 determines how to adapt the weighting for the UE-specific beamformed CSI-RS.

Figure 9A:
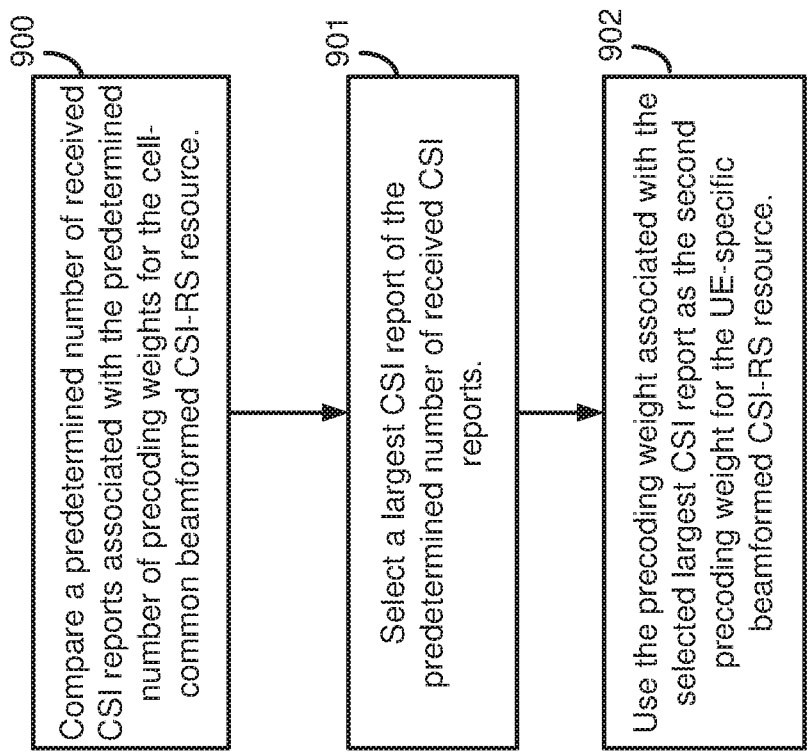
FIGS. 9A and 9B are block diagrams illustrating example blocks executed to implement aspects of the present disclosure.

FIG. 9A is a block diagram illustrating example blocks executed to implement one aspect of the present disclosure. At block 900, an eNB compares a predetermined number of received CSI reports associated with the predetermined number of precoding weights for the cell-common beamformed CSI-RS resource. In a first option for adapting the beamforming weight of the UE-specific beamformed CSI-RS resources, eNB 105 compares the last K CSI reports (e.g., RI/CQI) associated with K different precoding weights under control of controller/processor 240.

At block 901, the eNB selects a largest CSI report of the predetermined number of received CSI reports. For example, eNB 105 selects the CSI report with the largest CSI (e.g., RI and CQI) reported through the execution environment of weight adapting 1404. At block 902, the eNB uses the precoding weight associated with the selected largest CSI report as the second precoding weight for the UE-specific beamformed CSI-RS resource. For example, eNB 105 uses the weight associated with the largest CSI to precode the UE-specific beamformed CSI-RS resources. In such case, the precoding weight for UE-specific beamformed CSI-RS resources may be updated every K reporting cycles.

Figure 9B:
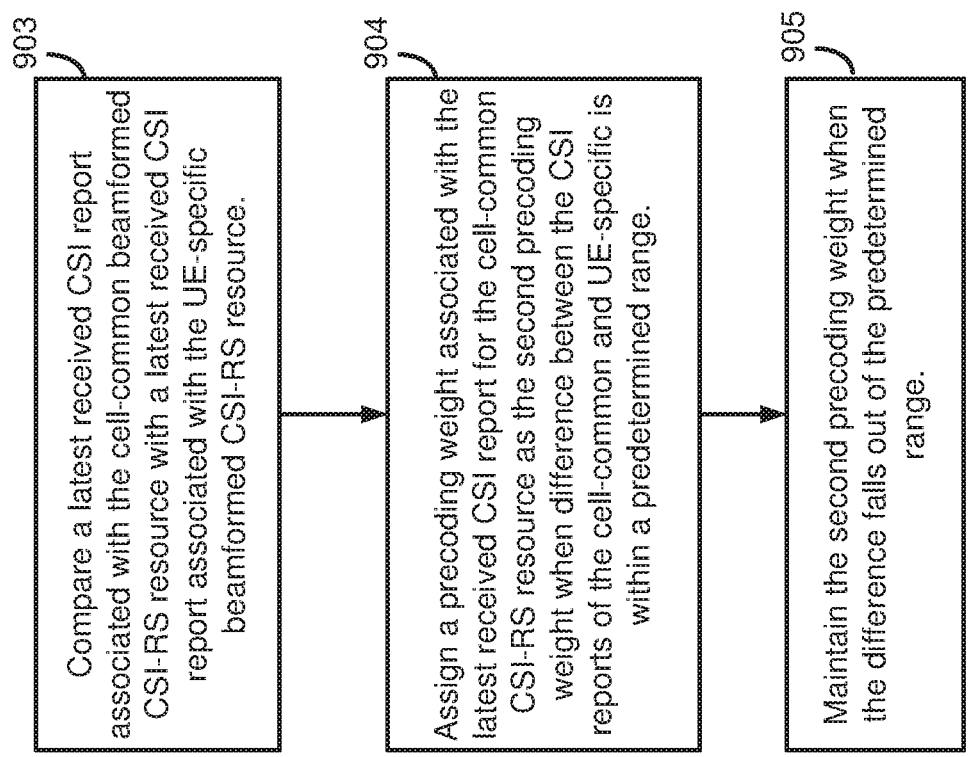

FIG. 9B is a block diagram illustrating example blocks executed to implement one aspect of the present disclosure. At block 903, an eNB compares a latest received CSI report associated with the cell-common beamformed CSI-RS resource with a latest received CSI report associated with the UE-specific beamformed CSI-RS resource. In the second option for adapting beamforming weights 1402 of the UE-specific beamformed CSI-RS resources, after receiving the latest CSI report for cell-common beamformed CSI-RS resource via antennas 234a-t and wireless radios 1400a-t, eNB 105 compares the CSI with the latest CSI report from UE-specific beamformed CSI-RS resources via the execution environment of weight adapting 1404.

At block 904, the eNB assigns a precoding weight associated with the latest received CSI report for the cell-common beamformed CSI-RS resource as the second precoding weight when difference between the CSI reports of the cell-common and UE-specific beamformed CSI-RS is within a predetermined range. For example, if the CSI reports for the cell-common and UE-specific beamformed CSI-RS resources are on the same level and within the predetermined range, eNB 105 may adapt the UE-specific beamforming weight through the execution environment of weight adapting 1404 using the precoding weight of beamforming weight 1402 associated with the latest CSI report for the cell-common BF CSI-RS.

At block 905, the eNB maintains the second precoding weight when the difference falls out of the predetermined range. For example, when the difference between the CSI reports for the cell-common and UE-specific beamformed CSI-RS resources falls outside of the predetermined range, eNB 105, through operation of weight adapting 1404, executed under control of controller/processor 240, would maintain the current precoding weights assigned to the UE-specific beamformed CSI-RS resources. If the first PMI is also reported for the cell-common beamformed CSI-RS, the preceding weight for the UE-specific beamformed CSI-RS resource may be a product of the preceding weight $B_k$ associated with the cell-common beamformed CSI-RS and the preceding matrix associated with the reported first PMI.

Figure 10A:
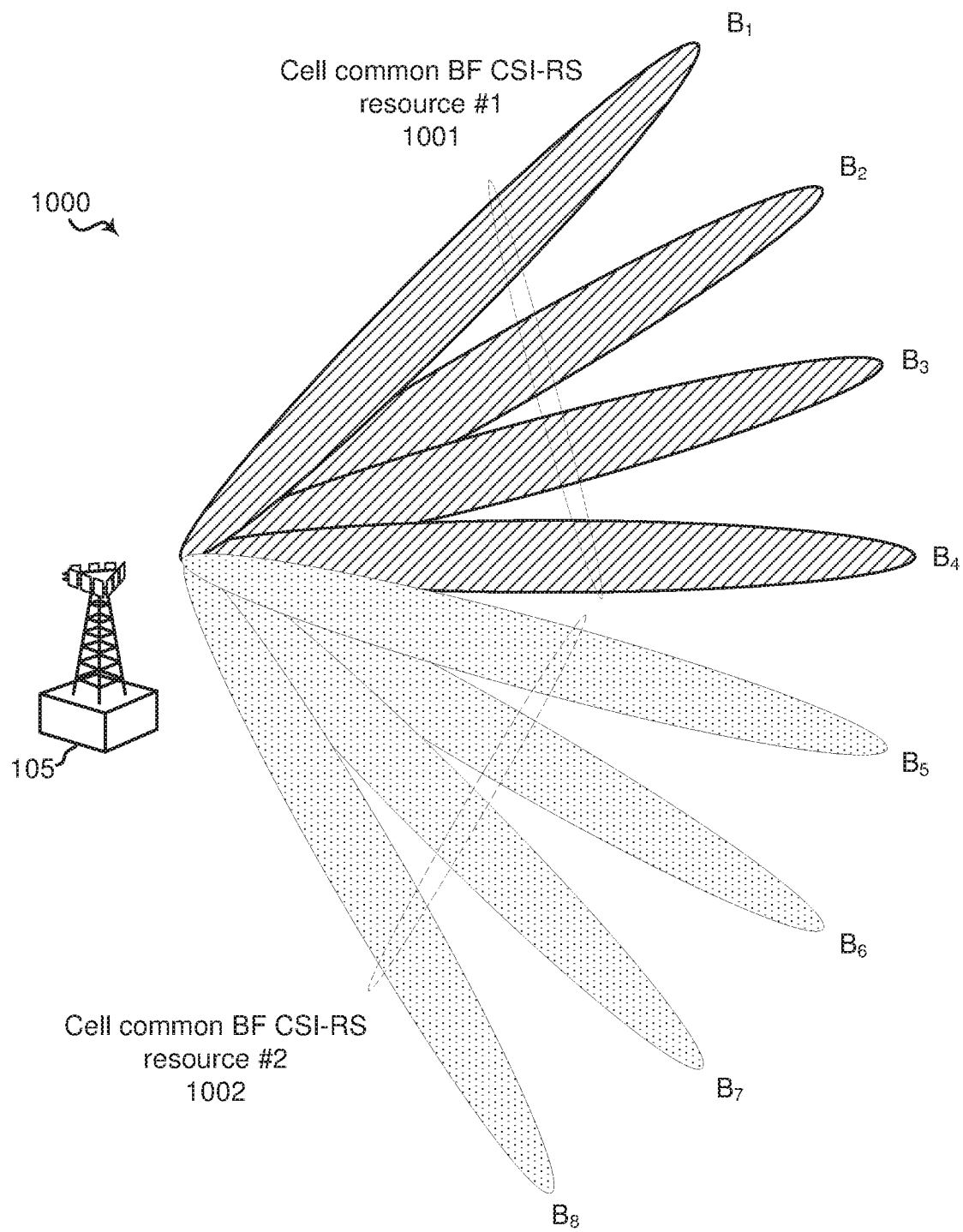
FIGS. 10A and 10B are block diagrams illustrating an eNB configured according to aspects of the present disclosure.

FIG. 10A is a block diagram illustrating an eNB 105 configured according to one aspect of the present disclosure. In transmission pattern 1000 from eNB 105, there may be multiple cell-common beamformed CSI-RS resources in the cell with only one of the cell-common beamformed CSI-RS resources are configured for CSI reporting for each UE. Each resource will be associated with a different set of beams which are TDM transmitted using the same resource. For example, cell-common beamformed CSI-RS resource #1 1001 may be associated with beams preceded with $B_1$-$B_4$, and cell-common beamformed CSI-RS resource #2 1002 may be associated with beams preceded with $B_5$-$B_8$. Different resources may be associated with different sets of beams corresponding to different coverages which may also be assigned to different groups of UEs. Reconfiguration of cell-common beamformed CSI-RS resources may be triggered based on the movement of the UE in the cell. Either layer 1 or RRC signaling may be used to signal the reconfiguration of beam sets. For example, layer 1 reconfiguration signals triggered measurement of one of multiple CSI-RS configurations.

Figure 10B:
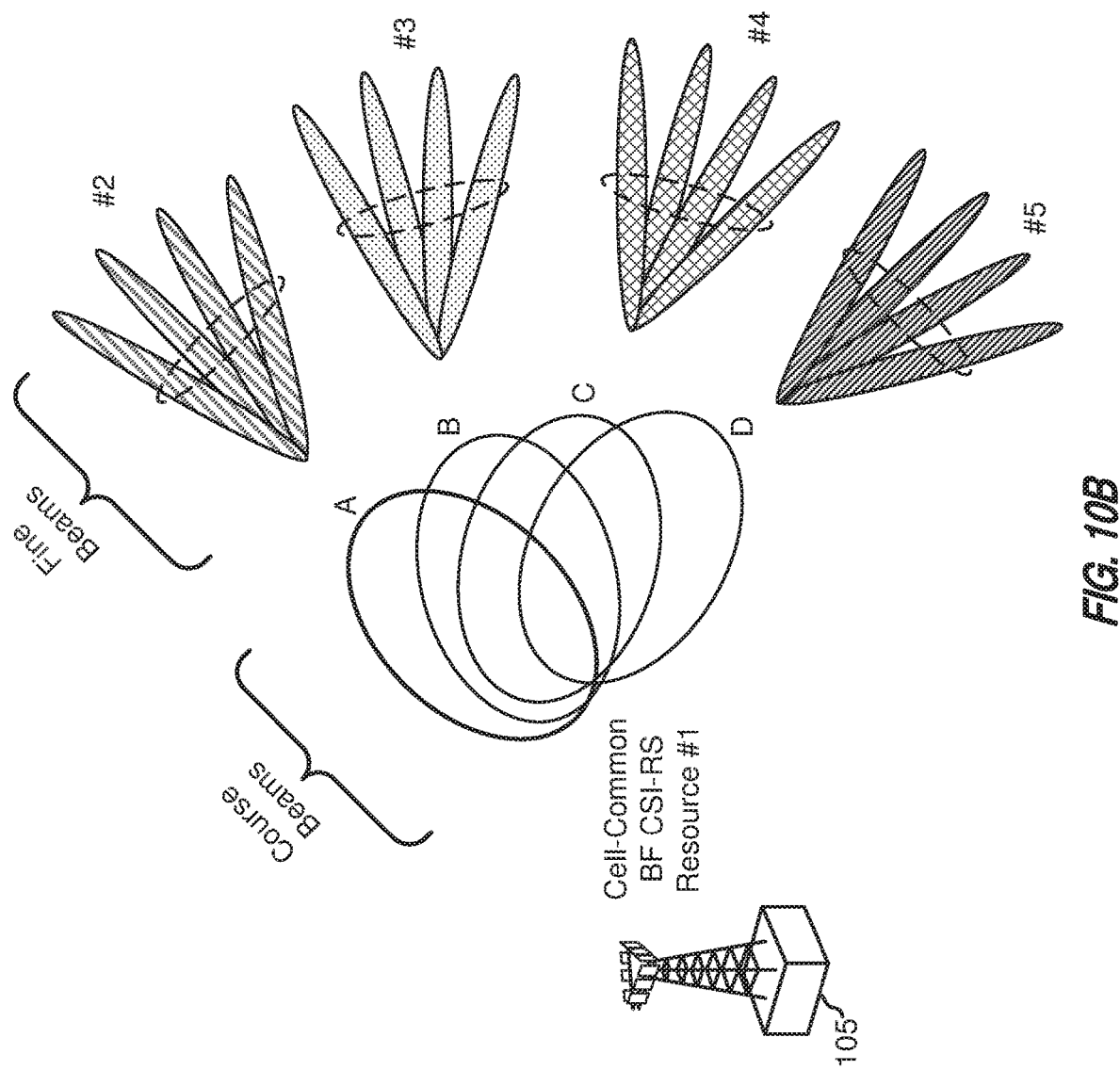

FIG. 10B is a block diagram illustrating an eNB 105 configured according to one aspect of the present disclosure. eNB 105 may also provide multi-stage cell-common beamformed CSI-RS resources for the first CSI feedback that may also reduce beam sweeping round trip time by using a smaller number of beams associated with a cell-common beamformed CSI-RS resource. The root CSI-RS resource, cell-common beamformed CSI-RS resource #1 from eNB 106, may be associated with four coarse beams. A-D, providing wide cell coverage. The four coarse beams, A-D, are TDM swept on the root CSI-RS resource, cell-common beamformed CSI-RS resource #1. Each of coarse beam A-D can further be divided into four finer beams, beams #2, #3, #4, and #5, with the same coverage as the associated coarse beam A-D. Therefore, there are sixteen finer beams shown in FIG. 10B. Each of the four finer beams, beams #2, #3, #4, and #5 may be TDM swept and assigned to one CSI-RS resource over time. Accordingly, there are four second-level CSI-RS resources. Similarly, each of the sixteen finer beams can further be divided into four finer beams (not shown in FIG. 10B) to create sixty-four finer beams in a third level. Correspondingly, there would be sixteen third-level CSI-RS resources. Each of the sixteen finer beams can further be divided into finer beams in a fourth level, fifth level, sixth level, and so on. The network may firstly configure the root or first level CSI-RS resource for UE for coarse beam tracking, then one of four second-level CSI-RS resources for finer beam tracking, then one of sixteen third-level CSI-RS resources for much finer beam tracking, and so on. As a result, a final UE-specific beamformed CSI-RS resource may be configured for CSI reporting.

Beam splitting for each of finer beams #2, #3, #4, and #5, may also be possible in order to increase beam granularity. The network may first configure the root CSI-RS resource, cell-common beamformed CSI-RS resource #1, for UE measurement and then, based on the CSI feedback, reconfigure a second level CSI-RS resource for the finer beam selection of beams #2, #3, #4, and #5. The network may dynamically reconfigure between the coarse and finer CSI-RS resources for UE-specific beam selection based on the received CSI feedback.

Figure 11:
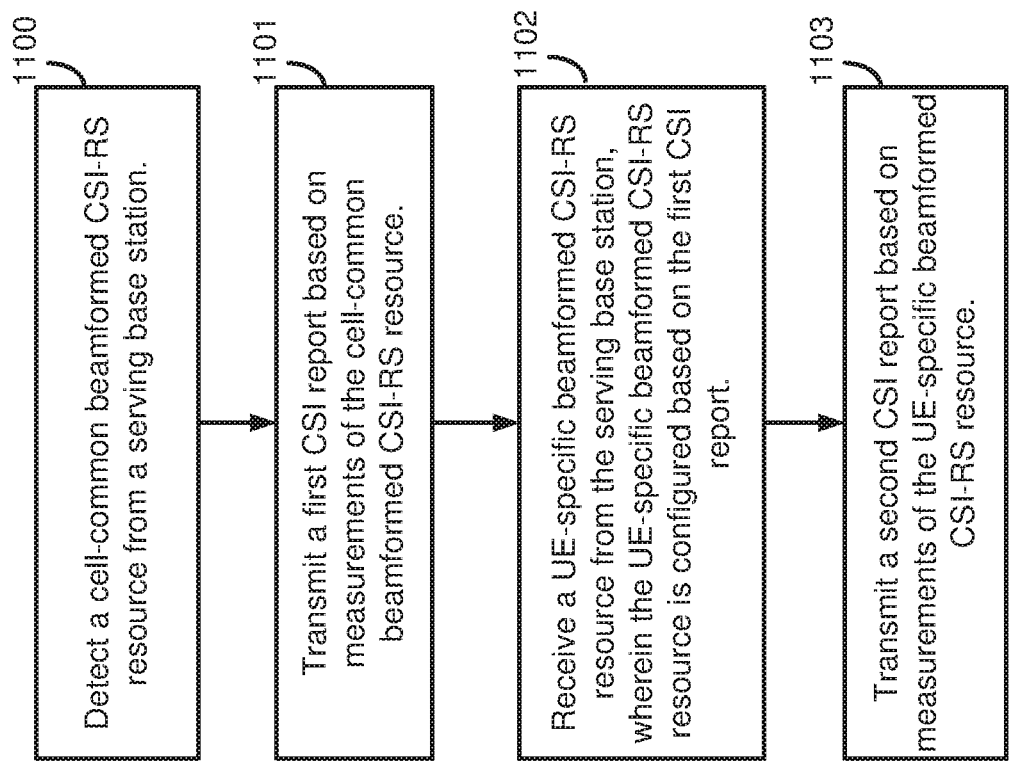
FIG. 11 is a block diagram illustrating example blocks executed to implement one aspect of the present disclosure.
Figure 15:
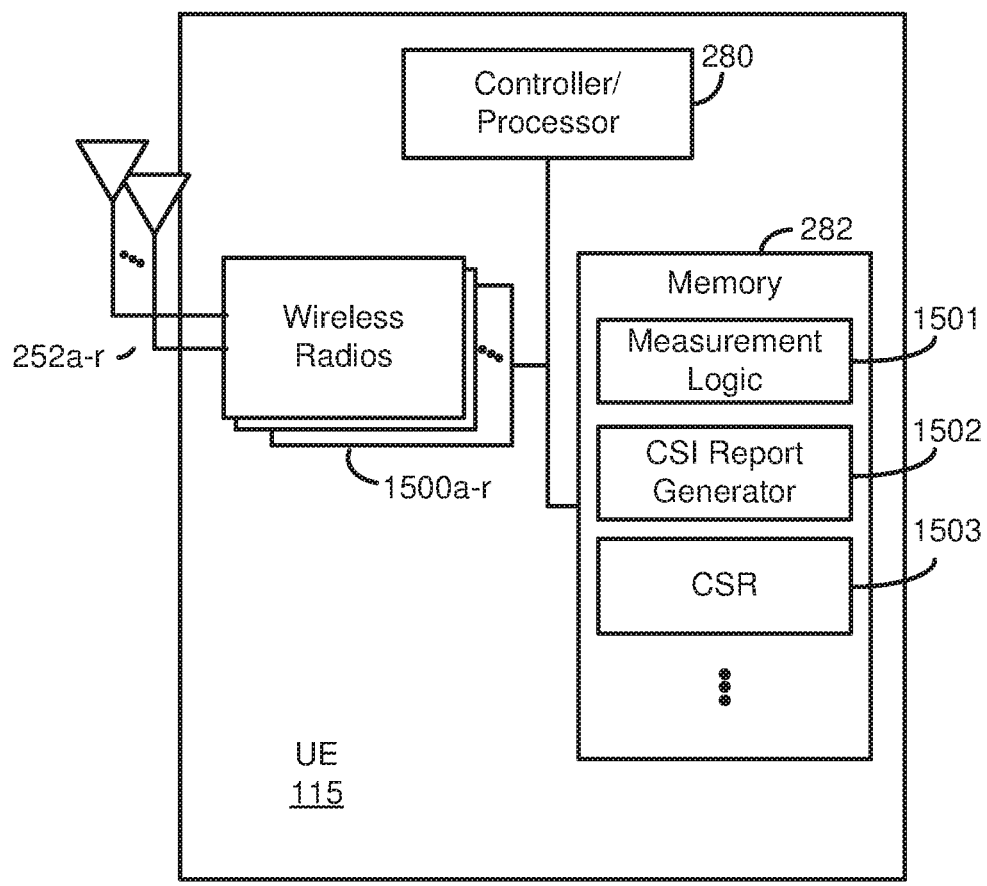
FIG. 15 is a block diagram illustrating an UE configured according to one aspect of the present disclosure.

FIG. 11 is a block diagram illustrating example blocks executed to implement one aspect of the present disclosure. The example blocks will also be described with respect to UE 115 as illustrated in FIG. 15. FIG. 15 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 1500a-t and antennas 252a-r. Wireless radios 1500a-t includes various components and hardware, as illustrated in FIG. 2 for eNB 105, including modulator/demodulators 254a-r. MIMO detector 256, receive processor 258, transmit processor 264, and TX MIMO processor 266.

At block 1100, a UE detects a cell-common beamformed CSI-RS resource from a serving base station. For example, UE 115 detects the cell-common beamformed CSI-RS resource via antennas 252a-r and wireless radios 1500a-r, under control of controller/processor 280.

At block 1102, the UE transmits a first CSI report based on measurements of the cell-common beamformed CSI-RS resource. UE 115 triggers measurement logic 1501, stored in memory 282, and executed by controller/processor 280 to measure CSI of the cell-common beamformed CSI-RS resource. The resulting CSI report is generated through execution of CSI report generator 1502, under control of controller/processor 280. UE 115 will then transmit the CSI reports over mobile radios 1500a-r and antennas 252a-r.

At block 1103, the UE receives a UE-specific beamformed CSI-RS resource from the serving base station, wherein the UE-specific beamformed CSI-RS resource is configured based on the first CSI report. For example, UE 115 detects the UE-specific beamformed CSI-RS resource via antennas 252a-r and wireless radios 1500a-r, under control of controller/processor 280. UE 115 would again execute measurement logic 1501 in memory 282, under control of controller/processor 280. At block 1104, the UE transmits a second CSI report based on measurements of the UE-specific beamformed CSI-RS resource. Under control of controller/processor 280, UE 115 transmits the CSI report generated by execution of CSI report generator 1502 via mobile radios 1500a-r and antennas 252a-r.

Figure 12:
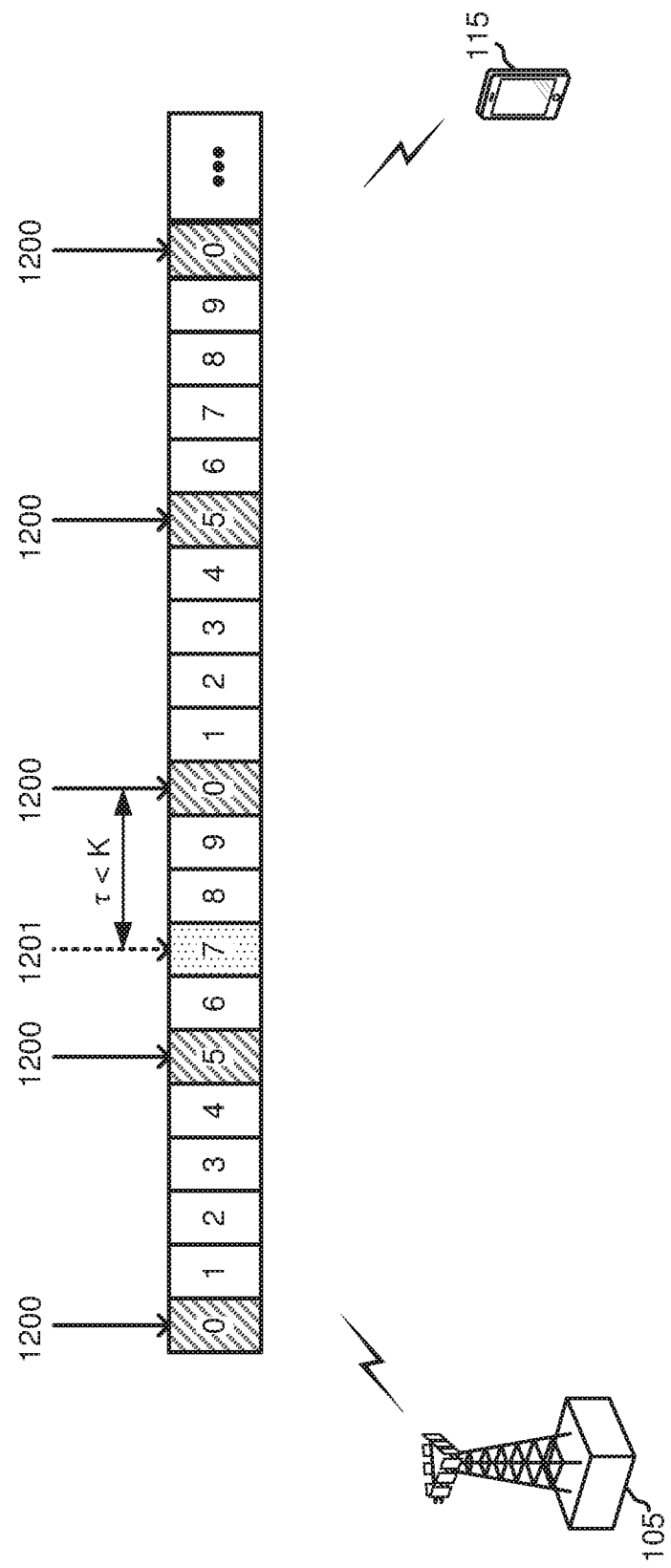
FIG. 12 is a block diagram illustrating an eNB and a UE configured according to one aspect of the present disclosure.

FIG. 12 is a block diagram illustrating an eNB 115 and a UE 105 configured according to one aspect of the present disclosure. Various aspects of the present disclosure are provided to further relax CSI computation so that UE 105 computes one CSI corresponding to either the cell-common or UE-specific beamformed CSI-RS resources at a given time period. For example, an A-CSI trigger will request a single CSI reporting according to the following rule. If both the UE-specific and cell-common beamformed CSI-RS resources are transmitted on the same subframe, the cell-common beamformed CSI-RS resource may be used for A-CSI reporting. If the most recent UE-specific and cell-common beamformed CSI-RS resources are separated by less than or equal to K subframes, the one transmitted earlier may be used for CSI reporting, otherwise the later one is used. For example, assuming A and B are one of the UE-specific beamformed CSI-RS resource or the cell-common beamformed CSI-RS resource. Where A is transmitted before B and if abs(A−B)<=K, then A is used for CSI reporting, otherwise B will be used for CSI reporting. K may either be fixed to a certain time, such as 5 ms, or it may be configured via higher layer signaling, e.g., equal to CQI reporting periodicity.

eNB 105 transmits UE-specific beamformed CSI-RS resource 1200 at subframes 0 and 5. At subframe 7, eNB 105 transmits the cell-common beamformed CSI-RS resource 1201. UE 115 begins sending CSI reports for the detected CSI-RS resources at subframe n+4 after receiving the CSI-RS resource at subframe n. Thus, after UE-specific beamformed CSI-RS resource 1200 at subframe 0, UE 115 begins transmitting CSI reports based on the UE-specific beamformed CSI-RS resource 1200 at subframe 4. UE 115 continues transmitting the CSI report until the next CSI report associated with the next UE-specific beamformed CSI-RS resource 1200 at subframe 1200. After receiving cell-common beamformed CSI-RS resource 1201 at subframe 7, UE 115 will not begin transmitting CSI based on the cell-common beamformed CSI-RS resource 1201 at subframe 1 as the time between receiving the previous UE-specific beamformed CSI-RS resource 1200 at subframe 5 and subframe 7 is less than K. Similarly, at receipt of the next UE-specific beamformed CSI-RS resource 1200 at subframe 0 according to the difference between the time of subframe 7 and next frame subframe 0 is again less than K. UE 115 will then begin transmitting CSI reports associated with cell-common beamformed CSI-RS resource 1201 at subframe 4.

For periodic CSI reporting, a partial CSI may be reported for a cell-common beamformed CSI-RS resource. There may be different options to implement a partial CSI report.

For example, in a first option, the partial CSI report may include an RI (max 3-bits), wideband CQI of the first codeword (4-bits), and an optional 4-bits for a first PMI. Alternatively, in a second option, the partial CSI report may include a 4-bit wideband CQI of the first codeword, a 3-bit differential CQI of the second codeword, and an optional 4-bit first PMI. The partial PMI, whether implemented in either option, will be reported in one subframe with a total maximum payload of 11 bits. The reporting periodicity can be independently configured using the same subframe offset as the CQI feedback for UE-specific beamformed CSI-RS resource. If UE-specific beamformed CSI-RS resource is activated. UE may transmit P-CSI reporting for UE-specific beamformed CSI-RS resource the same as the legacy operations, and a periodic CSI may consist of multiple reports based on the reporting mode, for example, wideband or subband, and the configured parameter for the alternative codebook. With the alternative codebook configured, under PUCCH mode 1-1, the first report may be an RI, while the second report is wideband CQI/PMI. For PUCCH mode 2-1, the first report may be RI, while the second report may be wideband CQI/PMI, and the third report may be subband CQI/PMI. If the alternative codebook is not configured, then under PUCCH mode 1-1 may be further configured as submode 1-1 or 1-2 for $N_k$=4 or 8. If UE-specific beamformed CSI-RS resource is turned OFF the periodic CSI reporting for UE-specific beamformed CSI-RS resources will not be reported.

Figure 13:
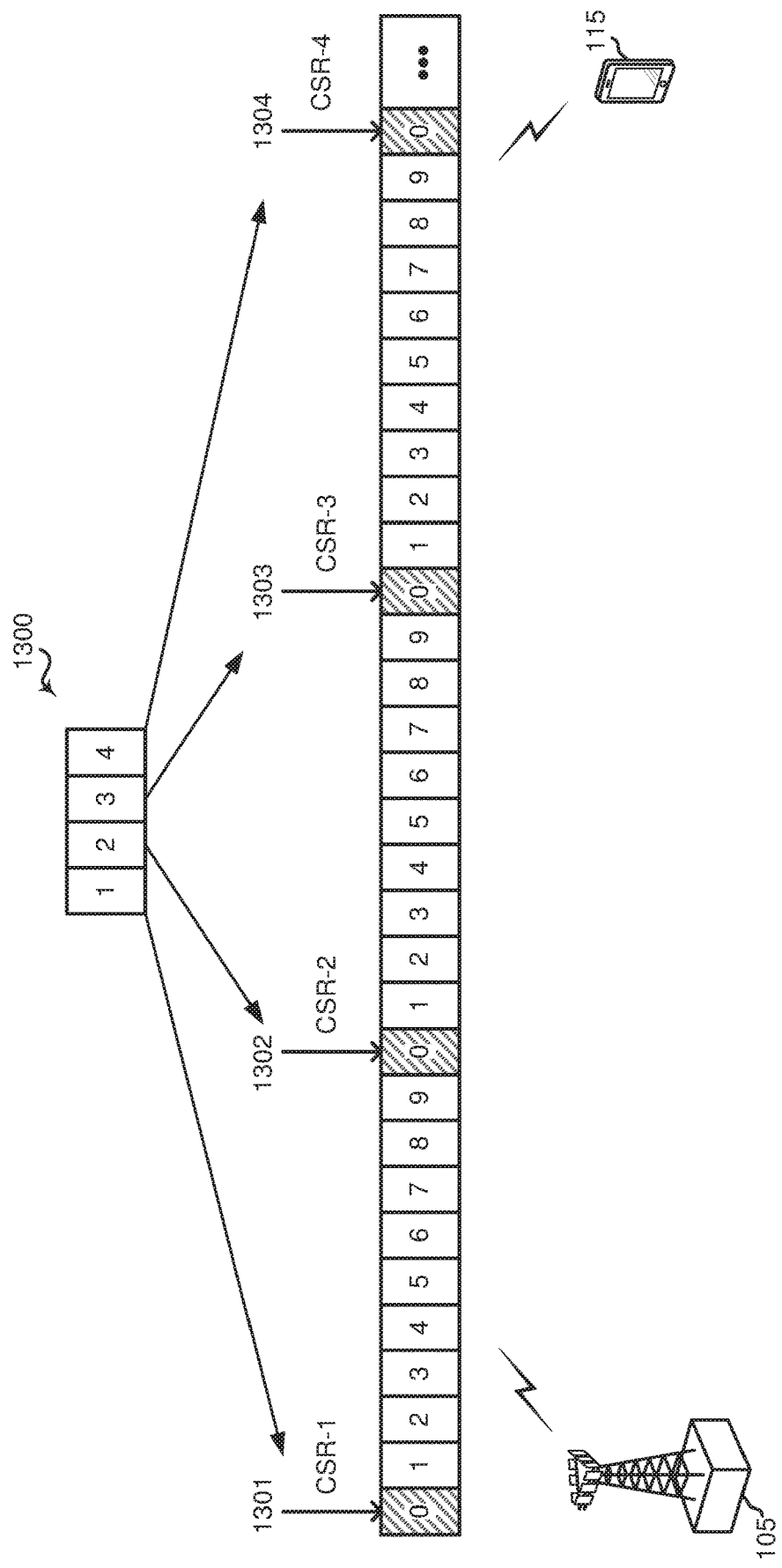
FIG. 13 is a block diagram illustrating an eNB and a UE configured according to one aspect of the present disclosure.

FIG. 13 is a block diagram illustrating an eNB 105 and a UE 115 configured according to one aspect of the present disclosure. For hybrid class B K>1 and class B K=1, multiple codebook subset restrictions (CSR) can be configured by eNB 105, each associated with one CSI-RS resource. Referring to FIG. 15, UE 115 would store the CSR in memory 181 at CSR 1503. In such a manner, the selection of CSI-RS resources is based on the spectrum efficiency taking into account inter-cell interference. For the proposed hybrid class B scheme, it may also be possible to configure multiple CSR, such as CSR 1300 stored at CSR 1503 in memory 282 of UE 115, for cell-common beamformed CSI-RS resources each applying to a specific transmission instance. For example, assuming the periodicity. T, and subframe offset. A, for the cell-common beamformed CSI-RS resource, the k-th CSR is used for the transmission instance satisfying $(10*n_f+\text{floor}(n_s/2)-\Delta-k*T) \mod (K*T)$, where $n_f$ and $n_s$ are radio frame number and slot number. K is the number of the configured CSR parameters, and k is a range from 0 to K−1. UE 115 may use the corresponding CSR when determining the CSI report for cell-common beamformed CSI-RS resources. As illustrated, for subframe 0 1301, according to CSR 1300, CSR-1 is selected for the first cell-common beamformed CSI-RS resource transmission. At the next transmission instance, at subframe 0 1302, CSR-2 is selected with cell-common beamformed CSI-RS resource being transmitted. Similar provisions are made for subframes 0 1303 and 1304 for identifying CSR-3 and CSR-4.

The present disclosure comprises a first aspect, such as a non-transitory computer-readable medium having program code recorded thereon, the program code comprising:

program code for causing a computer to transmit a cell-common beamformed channel state information (CSI) reference signal (CSI-RS) resource, wherein the cell-common beamformed CSI-RS resource is weighted by cycling through a set of predefined precoding weights;

program code for causing the computer to receive CSI feedback from at least one user equipment (UE), wherein the CSI feedback is based on the cell-common beamformed CSI-RS resource; and program code for causing the computer to transmit to the at least one UE a UE-specific beamformed CSI-RS resource, wherein the UE-specific beamformed CSI-RS resource is configured based on the CSI feedback from the at least one UE.

Based on the first aspect, the non-transitory computer-readable medium of a second aspect, wherein a precoding weight for the cell-common CSI-RS resource is changed at each transmission instance, and wherein the precoding weight selected is selected by cycling through the set of predefined precoding weights.

Based on the first aspect, the non-transitory computer-readable medium of a third aspect, wherein the UE-specific beamformed CSI-RS resource is configured using a second precoding weight adapted according to the CSI feedback associated with the cell-common beamformed CSI-RS resource.

Based on the first aspect, the non-transitory computer-readable medium of a fourth aspect, wherein the configuration of the UE-specific beamformed CSI-RS resource includes:

program code for causing the computer to compare a predetermined number of received CSI reports associated with the predetermined number of precoding weights for the cell-common beamformed CSI-RS resource;

program code for causing the computer to select a largest CSI report of the predetermined number of received CSI reports; and program code for causing the computer to use a precoding weight associated with the selected largest CSI report as the second precoding weight for the UE-specific beamformed CSI-RS resource.

Based on the first aspect, the non-transitory computer-readable medium of a fifth aspect, further including:

program code for causing the computer to identify an additional UE with resource needs;

program code for causing the computer to dynamically deactivate the UE-specific beamformed CSI-RS resource for the at least one UE; and program code for causing the computer to reassign the UE-specific beamformed CSI-RS resource for communication with the additional UE.

Based on the first aspect, the non-transitory computer-readable medium of a sixth aspect, wherein the configuration of the UE-specific beamformed CSI-RS resource includes:

program code for causing the computer to compare a latest received CSI report associated with the cell-common beamformed CSI-RS resource with a latest received CSI report associated with the UE-specific beamformed CSI-RS resource;

program code for causing the computer to assign a precoding weight associated with the latest received CSI report for the cell-common beamformed CSI-RS resource as the second precoding weight when a difference between the latest received CSI report associated with the cell-common beamformed CSI-RS resource and the latest received CSI report associated with the UE-specific beamformed CSI-RS resource falls within a predetermined range; and program code for causing the computer to maintain the second precoding weight when the difference falls out of the predetermined range.

Based on the first aspect, the non-transitory computer-readable medium of a seventh aspect, wherein the CSI feedback includes a first precoding matrix indicator (PMI), and wherein the second precoding weight includes a product of a precoding weight from the set of predetermined precoding weights associated with the cell-common beamformed CSI-RS resource and the precoding matrix associated with the first PMI.

Based on the first aspect, the non-transitory computer-readable medium of a eighth aspect, further including:

program code for causing the computer to configure a plurality of cell-common beamformed CSI-RS resources, wherein each of the plurality of cell-common beamformed CSI-RS resources is associated with a different set of beams;

program code for causing the computer to determine a location of the at least one UE within a coverage area, wherein the cell-common beamformed CSI-RS resource is selected from the plurality of cell-common beamformed CSI-RS resources according to the location of the at least one UE being favorable to a set of beams associated with the selected cell-common beamformed CSI-RS resource.

Based on the first aspect, the non-transitory computer-readable medium of a ninth aspect, further including:

program code for causing the computer to detect a new location of the at least one UE;

program code for causing the computer to select a new resource from the plurality of cell-common beamformed CSI-RS resources for the cell-common beamformed CSI-RS based on the new location; and program code for causing the computer to signal the at least one UE the new resource for the cell-common beamformed CSI-RS resource for CSI reporting.

A tenth aspect of the non-transitory computer-readable medium of any combination of the first through ninth aspects.

The present disclosure comprises a eleventh aspect, such as a non-transitory computer-readable medium having program code recorded thereon, the program code comprising:

program code for causing a computer to detect a cell-common beamformed channel state information (CSI) reference signal (CSI-RS) resource from a serving base station;

program code for causing the computer to transmit a first CSI report based on measurements of the cell-common beamformed CSI-RS resource;

program code for causing the computer to receive a user equipment (UE)-specific beamformed CSI-RS resource from the serving base station, wherein the UE-specific beamformed CSI-RS resource is configured based on the first CSI report; and program code for causing the computer to transmit a second CSI report based on measurements of the UE-specific beamformed CSI-RS resource.

Based on the eleventh aspect, the non-transitory computer-readable medium of a twelfth aspect, further including:

program code for causing the computer to receive a trigger signal from the serving base station to perform aperiodic CSI reporting;

program code for causing the computer to transmit an aperiodic CSI report for the cell-common beamformed CSI-RS resource only, when the cell-common beamformed CSI-RS resource and UE-specific beamformed CSI-RS are transmitted in a same subframe;

program code for causing the computer to transmit the aperiodic CSI report for a first-received of a most recent one of: the cell-common beamformed CSI-RS resource or the UE-specific beamformed CSI-RS resource when a time between receipt of the first-received of the most recent one of: the cell-common beamformed CSI-RS resource or the UE-specific beamformed CSI-RS resource and a second-received of the most recent one of: the cell-common beamformed CSI-RS resource or UE-specific beamformed CSI-RS resource is less than or equal to a predetermined threshold; and program code for causing the computer to transmit the aperiodic CSI report for the second-received of the most recent one of: the cell-common beamformed CSI-RS resource or the UE-specific beamformed CSI-RS resource when the time is greater than the predetermined threshold.

Based on the eleventh aspect, the non-transitory computer-readable medium of a thirteenth aspect, wherein the first CSI report and the second CSI report are periodic CSI reports, wherein the first CSI report includes one of:

a rank indicator, a wideband channel quality indicator (CQI) of the first codeword, and a first precoding matrix indicator (PMI), and a wideband 4-bit channel quality indicator (CQI) of the first codeword, a differential 3-bits CQI of the second codeword, and a first precoding matrix indicator (PMI).

Based on the eleventh aspect, the non-transitory computer-readable medium of a fourteenth aspect, wherein the first CSI report is jointly reported on the same subframe, wherein the second CSI report is reported according to a legacy reporting mode.

Based on the eleventh aspect, the non-transitory computer-readable medium of a fifteenth aspect, further including:

program code for causing the computer to receive a plurality of codebook subset restrictions (CSR) from the serving base station;

program code for causing the computer to determine a CSR from the plurality of CSR for the first CSI report based on a mapping of the plurality of CSR associated to the cell-common beamformed CSI-RS resource transmission instance.

Based on the eleventh aspect, the non-transitory computer-readable medium of a sixteenth aspect, wherein the cell-common beamformed CSI-RS resource and the UE-specific beamformed CSI-RS resource are associated with a single CSI process having a different set of parameters, wherein parameters for the different set of parameters include one or more of:

number of ports;
codebook type;
periodicity;
subframe offset;
resource element location; and
CSI reporting mode.

A seventeenth aspect of the non-transitory computer-readable medium of any combination of the eleventh through sixteenth aspects.

The present disclosure comprises an eighteenth aspect, such as an apparatus configured for wireless communication, the apparatus comprising:

at least one processor; and
a memory coupled to the at least one processor,
wherein the at least one processor is configured:
to transmit a cell-common beamformed channel state information (CSI) reference signal (CSI-RS) resource, wherein the cell-common beamformed CSI-RS resource is weighted by cycling through a set of predefined precoding weights;

to receive CSI feedback from at least one user equipment (UE), wherein the CSI feedback is based on the cell-common beamformed CSI-RS resource; and to transmit to the at least one UE a UE-specific beamformed CSI-RS resource, wherein the UE-specific beamformed CSI-RS resource is configured based on the CSI feedback from the at least one UE.

Based on the eighteenth aspect, the apparatus of a nineteenth aspect, wherein a precoding weight for the cell-common CSI-RS resource is changed at each transmission instance, and wherein the precoding weight selected is selected by cycling through the set of predefined precoding weights.

Based on the eighteenth aspect, the apparatus of a twentieth aspect, wherein the UE-specific beamformed CSI-RS resource is configured using a second precoding weight adapted according to the CSI feedback associated with the cell-common beamformed CSI-RS resource.

Based on the eighteenth aspect, the apparatus of a twenty-first aspect, wherein the configuration of the UE-specific beamformed CSI-RS resource includes:

configuration to compare a predetermined number of received CSI reports associated with the predetermined number of precoding weights for the cell-common beamformed CSI-RS resource;

configuration to select a largest CSI report of the predetermined number of received CSI reports; and configuration to use a preceding weight associated with the selected largest CSI report as the second precoding weight for the UE-specific beamformed CSI-RS resource.

Based on the eighteenth aspect, the apparatus of a twenty-second aspect, further including configuration of the at least one processor:

to identify an additional UE with resource needs;
to dynamically deactivate the UE-specific beamformed CSI-RS resource for the at least one UE; and
to reassign the UE-specific beamformed CSI-RS resource for communication with the additional UE.

Based on the eighteenth aspect, the apparatus of a twenty-third aspect, wherein the configuration of the UE-specific beamformed CSI-RS resource includes:

configuration to compare a latest received CSI report associated with the cell-common beamformed CSI-RS resource with a latest received CSI report associated with the UE-specific beamformed CSI-RS resource;

configuration to assign a preceding weight associated with the latest received CSI report for the cell-common beamformed CSI-RS resource as the second preceding weight when a difference between the latest received CSI report associated with the cell-common beamformed CSI-RS resource and the latest received CSI report associated with the UE-specific beamformed CSI-RS resource falls within a predetermined range; and configuration to maintain the second precoding weight when the difference falls out of the predetermined range.

Based on the eighteenth aspect, the apparatus of a twenty-fourth aspect, wherein the CSI feedback includes a first precoding matrix indicator (PMI), and wherein the second preceding weight includes a product of a preceding weight from the set of predetermined precoding weights associated with the cell-common beamformed CSI-RS resource and the preceding matrix associated with the first PMI.

Based on the eighteenth aspect, the apparatus of a twenty-fifth aspect, further including configuration of the at least one processor:

to configure a plurality of cell-common beamformed CSI-RS resources, wherein each of the plurality of cell-common beamformed CSI-RS resources is associated with a different set of beams;

to determine a location of the at least one UE within a coverage area, wherein the cell-common beamformed CSI-RS resource is selected from the plurality of cell-common beamformed CSI-RS resources according to the location of the at least one UE being favorable to a set of beams associated with the selected cell-common beamformed CSI-RS resource.

Based on the eighteenth aspect, the apparatus of a twenty-sixth aspect, further including configuration of the at least one processor:

to detect a new location of the at least one UE;

to select a new resource from the plurality of cell-common beamformed CSI-RS resources for the cell-common beamformed CSI-RS based on the new location; and to signal the at least one UE the new resource for the cell-common beamformed CSI-RS resource for CSI reporting.

A twenty-seventh aspect of the apparatus of any combination of the eighteenth through twenty-sixth aspects.

The present disclosure comprises an twenty-eighth aspect, such as an apparatus configured for wireless communication, the apparatus comprising:

at least one processor; and a memory coupled to the at least one processor, wherein the at least one processor is configured:

to detect a cell-common beamformed channel state information (CSI) reference signal (CSI-RS) resource from a serving base station;

to transmit a first CSI report based on measurements of the cell-common beamformed CSI-RS resource;

to receive a user equipment (UE)-specific beamformed CSI-RS resource from the serving base station, wherein the UE-specific beamformed CSI-RS resource is configured based on the first CSI report; and to transmit a second CSI report based on measurements of the UE-specific beamformed CSI-RS resource.

Based on the twenty-eighth aspect, the apparatus of a twenty-ninth aspect, further including configuration of the at least one processor:

to receive a trigger signal from the serving base station to perform aperiodic CSI reporting;

to transmit an aperiodic CSI report for the cell-common beamformed CSI-RS resource only, when the cell-common beamformed CSI-RS resource and UE-specific beamformed CSI-RS are transmitted in a same subframe;

to transmit the aperiodic CSI report for a first-received of a most recent one of: the cell-common beamformed CSI-RS resource or the UE-specific beamformed CSI-RS resource when a time between receipt of the first-received of the most recent one of: the cell-common beamformed CSI-RS resource or the UE-specific beamformed CSI-RS resource and a second-received of the most recent one of: the cell-common beamformed CSI-RS resource or UE-specific beamformed CSI-RS resource is less than or equal to a predetermined threshold; and to transmit the aperiodic CSI report for the second-received of the most recent one of: the cell-common beamformed CSI-RS resource or the UE-specific beamformed CSI-RS resource when the time is greater than the predetermined threshold.

Based on the twenty-eighth aspect, the apparatus of a thirtieth aspect, wherein the first CSI report and the second CSI report are periodic CSI reports, wherein the first CSI report includes one of:

a rank indicator, a wideband channel quality indicator (CQI) of the first codeword, and a first precoding matrix indicator (PMI), and a wideband 4-bit channel quality indicator (CQI) of the first codeword, a differential 3-bits CQI of the second codeword, and a first precoding matrix indicator (PMI).

Based on the twenty-eighth aspect, the apparatus of a thirty-first aspect, wherein the first CSI report is jointly reported on the same subframe, wherein the second CSI report is reported according to a legacy reporting mode.

Based on the twenty-eighth aspect, the apparatus of a thirty-second aspect, further including configuration of the at least one processor:

to receive a plurality of codebook subset restrictions (CSR) from the serving base station;

to determine a CSR from the plurality of CSR for the first CSI report based on a mapping of the plurality of CSR associated to the cell-common beamformed CSI-RS resource transmission instance.

Based on the twenty-eighth aspect, the apparatus of a thirty-third aspect, wherein the cell-common beamformed CSI-RS resource and the UE-specific beamformed CSI-RS resource are associated with a single CSI process having a different set of parameters, wherein parameters for the different set of parameters include one or more of:

number of ports;

codebook type;

periodicity;

subframe offset;

resource element location; and

CSI reporting mode.

A thirty-fourth aspect of the apparatus of any combination of the twenty-eighth through thirty-third aspects.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules described herein may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented through computer-executable instructions in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   transmitting a cell-common beamformed channel state information (CSI) reference signal (CSI-RS) resource, wherein the cell-common beamformed CSI-RS resource is weighted by cycling through a set of predefined precoding weights;
   receiving CSI feedback from at least one user equipment (UE), wherein the CSI feedback is based on the cell-common beamformed CSI-RS resource; and
   transmitting to the at least one UE a UE-specific beamformed CSI-RS resource, wherein the UE-specific beamformed CSI-RS resource is configured based on the CSI feedback from the at least one UE, wherein the UE-specific beamformed CSI-RS resource is configured using a second precoding weight adapted according to the CSI feedback associated with the cell-common beamformed CSI-RS resource, wherein the second precoding weight is based on at least one of a rank indicator (RI) or a precoding matrix indicator (PMI) associated with the CSI feedback.

2. The method of claim 1, wherein a precoding weight for the cell-common CSI-RS resource is changed at each transmission instance, and wherein the precoding weight selected is selected by cycling through the set of predefined precoding weights.

3. The method of claim 1, wherein the configuration of the UE-specific beamformed CSI-RS resource includes:
   comparing a predetermined number of received CSI reports associated with the predetermined number of precoding weights for the cell-common beamformed CSI-RS resource;
   selecting a largest CSI report of the predetermined number of received CSI reports; and
   using a precoding weight associated with the selected largest CSI report as the second precoding weight for the UE-specific beamformed CSI-RS resource.

4. The method of claim 1, further including:
   identifying an additional UE with resource needs;
   dynamically deactivating the UE-specific beamformed CSI-RS resource for the at least one UE; and
   reassigning the UE-specific beamformed CSI-RS resource for communication with the additional UE.

5. The method of claim 1, wherein the configuration of the UE-specific beamformed CSI-RS resource includes:
comparing a latest received CSI report associated with the cell-common beamformed CSI-RS resource with a latest received CSI report associated with the UE-specific beamformed CSI-RS resource;
assigning a precoding weight associated with the latest received CSI report for the cell-common beamformed CSI-RS resource as the second precoding weight when a difference between the latest received CSI report associated with the cell-common beamformed CSI-RS resource and the latest received CSI report associated with the UE-specific beamformed CSI-RS resource falls within a predetermined range; and
maintaining the second precoding weight when the difference falls out of the predetermined range.

6. The method of claim 1, wherein the CSI feedback includes a first PMI, and wherein the second precoding weight includes a product of a precoding weight from the set of predetermined precoding weights associated with the cell-common beamformed CSI-RS resource and the precoding matrix associated with the first PMI.

7. The method of claim 1, further including:
configuring a plurality of cell-common beamformed CSI-RS resources, wherein each of the plurality of cell-common beamformed CSI-RS resources is associated with a different set of beams;
determining a location of the at least one UE within a coverage area, wherein the cell-common beamformed CSI-RS resource is selected from the plurality of cell-common beamformed CSI-RS resources according to the location of the at least one UE being favorable to a set of beams associated with the selected cell-common beamformed CSI-RS resource.

8. The method of claim 7, further including:
detecting a new location of the at least one UE;
selecting a new resource from the plurality of cell-common beamformed CSI-RS resources for the cell-common beamformed CSI-RS based on the new location; and
signaling the at least one UE the new resource for the cell-common beamformed CSI-RS resource for CSI reporting.

9. A method of wireless communication, comprising:
detecting a cell-common beamformed channel state information (CSI) reference signal (CSI-RS) resource from a serving base station;
transmitting a first CSI report based on measurements of the cell-common beamformed CSI-RS resource;
receiving a user equipment (UE)-specific beamformed CSI-RS resource from the serving base station, wherein the UE-specific beamformed CSI-RS resource is configured based on the first CSI report, wherein the UE-specific beamformed CSI-RS resource is configured using a second precoding weight adapted according to the first CSI report associated with the cell-common beamformed CSI-RS resource, wherein the second precoding weight is based on at least one of a rank indicator (RI) or a precoding matrix indicator (PMI) associated with the first CSI report; and
transmitting a second CSI report based on measurements of the UE-specific beamformed CSI-RS resource.

10. The method of claim 9, further including:
receiving a trigger signal from the serving base station to perform aperiodic CSI reporting;
transmitting an aperiodic CSI report for the cell-common beamformed CSI-RS resource only, when the cell-common beamformed CSI-RS resource and UE-specific beamformed CSI-RS are transmitted in a same subframe;
transmitting the aperiodic CSI report for a first-received of a most recent one of: the cell-common beamformed CSI-RS resource or the UE-specific beamformed CSI-RS resource when a time between receipt of the first-received of the most recent one of: the cell-common beamformed CSI-RS resource or the UE-specific beamformed CSI-RS resource and a second-received of the most recent one of: the cell-common beamformed CSI-RS resource or UE-specific beamformed CSI-RS resource is less than or equal to a predetermined threshold; and
transmitting the aperiodic CSI report for the second-received of the most recent one of: the cell-common beamformed CSI-RS resource or the UE-specific beamformed CSI-RS resource when the time is greater than the predetermined threshold.

11. The method of claim 9, further including:
receiving a plurality of codebook subset restrictions (CSR) from the serving base station;
determining a CSR from the plurality of CSR for the first CSI report based on a mapping of the plurality of CSR associated to the cell-common beamformed CSI-RS resource transmission instance.

12. The method of claim 9, wherein the cell-common beamformed CSI-RS resource and the UE-specific beamformed CSI-RS resource are associated with a single CSI process having a different set of parameters, wherein parameters for the different set of parameters include one or more of:
number of ports;
codebook type;
periodicity;
subframe offset;
resource element location; and
CSI reporting mode.

13. An apparatus configured for wireless communication, comprising:
means for transmitting a cell-common beamformed channel state information (CSI) reference signal (CSI-RS) resource, wherein the cell-common beamformed CSI-RS resource is weighted by cycling through a set of predefined precoding weights;
means for receiving CSI feedback from at least one user equipment (UE), wherein the CSI feedback is based on the cell-common beamformed CSI-RS resource; and
means for transmitting to the at least one UE a UE-specific beamformed CSI-RS resource, wherein the UE-specific beamformed CSI-RS resource is configured based on the CSI feedback from the at least one UE, wherein the UE-specific beamformed CSI-RS resource is configured using a second precoding weight adapted according to the CSI feedback associated with the cell-common beamformed CSI-RS resource, wherein the second precoding weight is based on at least one of a rank indicator (RI) or a precoding matrix indicator (PMI) associated with the CSI feedback.

14. The apparatus of claim 13, wherein a precoding weight for the cell-common CSI-RS resource is changed at each transmission instance, and wherein the precoding weight selected is selected by cycling through the set of predefined precoding weights.

15. The apparatus of claim 13, wherein for the configuration of the UE-specific beamformed CSI-RS resource, further including:

means for comparing a predetermined number of received CSI reports associated with the predetermined number of precoding weights for the cell-common beamformed CSI-RS resource;
means for selecting a largest CSI report of the predetermined number of received CSI reports; and
means for using a precoding weight associated with the selected largest CSI report as the second precoding weight for the UE-specific beamformed CSI-RS resource.

16. The apparatus of claim 13, further including:
means for identifying an additional UE with resource needs;
means for dynamically deactivating the UE-specific beamformed CSI-RS resource for the at least one UE; and
means for reassigning the UE-specific beamformed CSI-RS resource for communication with the additional UE.

17. The apparatus of claim 13, wherein for the configuration of the UE-specific beamformed CSI-RS resource, further including:
means for comparing a latest received CSI report associated with the cell-common beamformed CSI-RS resource with a latest received CSI report associated with the UE-specific beamformed CSI-RS resource;
means for assigning a precoding weight associated with the latest received CSI report for the cell-common beamformed CSI-RS resource as the second precoding weight when a difference between the latest received CSI report associated with the cell-common beamformed CSI-RS resource and the latest received CSI report associated with the UE-specific beamformed CSI-RS resource falls within a predetermined range; and
means for maintaining the second precoding weight when the difference falls out of the predetermined range.

18. The apparatus of claim 13, wherein the CSI feedback includes a first PMI, and wherein the second precoding weight includes a product of a precoding weight from the set of predetermined precoding weights associated with the cell-common beamformed CSI-RS resource and the precoding matrix associated with the first PMI.

19. The apparatus of claim 13, further including:
means for configuring a plurality of cell-common beamformed CSI-RS resources, wherein each of the plurality of cell-common beamformed CSI-RS resources is associated with a different set of beams;
means for determining a location of the at least one UE within a coverage area, wherein the cell-common beamformed CSI-RS resource is selected from the plurality of cell-common beamformed CSI-RS resources according to the location of the at least one UE being favorable to a set of beams associated with the selected cell-common beamformed CSI-RS resource.

20. The apparatus of claim 19, further including:
means for detecting a new location of the at least one UE;
means for selecting a new resource from the plurality of cell-common beamformed CSI-RS resources for the cell-common beamformed CSI-RS based on the new location; and
means for signaling the at least one UE the new resource for the cell-common beamformed CSI-RS resource for CSI reporting.

21. An apparatus configured for wireless communication, comprising:
means for detecting a cell-common beamformed channel state information (CSI) reference signal (CSI-RS) resource from a serving base station;
means for transmitting a first CSI report based on measurements of the cell-common beamformed CSI-RS resource;
means for receiving a user equipment (UE)-specific beamformed CSI-RS resource from the serving base station, wherein the UE-specific beamformed CSI-RS resource is configured based on the first CSI report, wherein the UE-specific beamformed CSI-RS resource is configured using a second precoding weight adapted according to the first CSI report associated with the cell-common beamformed CSI-RS resource, wherein the second precoding weight is based on at least one of a rank indicator (RI) or a precoding matrix indicator (PMI) associated with the first CSI report; and
means for transmitting a second CSI report based on measurements of the UE-specific beamformed CSI-RS resource.

22. The apparatus of claim 21, further including:
means for receiving a trigger signal from the serving base station to perform aperiodic CSI reporting;
means for transmitting an aperiodic CSI report for the cell-common beamformed CSI-RS resource only, when the cell-common beamformed CSI-RS resource and UE-specific beamformed CSI-RS are transmitted in a same subframe;
means for transmitting the aperiodic CSI report for a first-received of a most recent one of: the cell-common beamformed CSI-RS resource or the UE-specific beamformed CSI-RS resource when a time between receipt of the first-received of the most recent one of: the cell-common beamformed CSI-RS resource or the UE-specific beamformed CSI-RS resource and a second-received of the most recent one of: the cell-common beamformed CSI-RS resource or UE-specific beamformed CSI-RS resource is less than or equal to a predetermined threshold; and
means for transmitting the aperiodic CSI report for the second-received of the most recent one of: the cell-common beamformed CSI-RS resource or the UE-specific beamformed CSI-RS resource when the time is greater than the predetermined threshold.

23. The apparatus of claim 21, further including:
means for receiving a plurality of codebook subset restrictions (CSR) from the serving base station;
means for determining a CSR from the plurality of CSR for the first CSI report based on a mapping of the plurality of CSR associated to the cell-common beamformed CSI-RS resource transmission instance.

24. The apparatus of claim 21, wherein the cell-common beamformed CSI-RS resource and the UE-specific beamformed CSI-RS resource are associated with a single CSI process having a different set of parameters, wherein parameters for the different set of parameters include one or more of:
number of ports;
codebook type;
periodicity;
subframe offset;
resource element location; and
CSI reporting mode.

* * * * *